United States Patent
Wang et al.

(10) Patent No.: US 11,419,160 B2
(45) Date of Patent: Aug. 16, 2022

(54) NETWORK ACCESS METHOD, TERMINAL DEVICE, AND NETWORK DEVICE

(71) Applicant: HUAWEI TECHNOLOGIES CO., LTD., Guangdong (CN)

(72) Inventors: Rui Wang, Shanghai (CN); Mingzeng Dai, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 125 days.

(21) Appl. No.: 16/875,213

(22) Filed: May 15, 2020

(65) Prior Publication Data

US 2020/0281031 A1 Sep. 3, 2020

Related U.S. Application Data

(63) Continuation of application No. PCT/CN2018/109177, filed on Sep. 30, 2018.

(30) Foreign Application Priority Data

Nov. 17, 2017 (CN) .......................... 201711148984.8

(51) Int. Cl.
  *H04L 9/40* (2022.01)
  *G06Q 20/12* (2012.01)
  (Continued)

(52) U.S. Cl.
  CPC ......... *H04W 76/10* (2018.02); *H04W 12/041* (2021.01); *H04W 12/106* (2021.01);
  (Continued)

(58) Field of Classification Search
  CPC . H04W 76/10; H04W 12/041; H04W 12/106; H04W 80/02; H04W 88/06;
  (Continued)

(56) References Cited

U.S. PATENT DOCUMENTS

2013/0148607 A1  6/2013  Yu et al.
2017/0079017 A1  3/2017  Kim et al.
(Continued)

FOREIGN PATENT DOCUMENTS

CN  104797007 A  7/2015
CN  106332048 A  1/2017
(Continued)

OTHER PUBLICATIONS

3GPP TS 33.401 V15.1.0 (Sep. 2017), "3rd Generation Partnership Project; Technical Specification Group Services and System Aspects; 3GPP System Architecture Evolution (SAE); Security architecture (Release 15)," Sep. 2017, 161 pages.
(Continued)

*Primary Examiner* — Joseph E Dean, Jr.
(74) *Attorney, Agent, or Firm* — Fish & Richardson P.C.

(57) ABSTRACT

The present disclosure relates to network access methods, terminal devices, and network devices. One example method includes sending a first message to a network device, where the first message includes first indication information, and the first indication information is used to indicate a type of a core network to be accessed by a terminal device, and receiving a second message sent by the network device, where packet data convergence protocol is used for the second message, and version of the packet data convergence protocol corresponds to the type of the core network.

17 Claims, 12 Drawing Sheets

(51) Int. Cl.
  *H04W 76/10* (2018.01)
  *H04W 12/041* (2021.01)
  *H04W 12/106* (2021.01)
  *H04W 80/02* (2009.01)
  *H04W 88/06* (2009.01)
(52) U.S. Cl.
  CPC ........... *G06Q 20/127* (2013.01); *H04W 80/02* (2013.01); *H04W 88/06* (2013.01)
(58) Field of Classification Search
  CPC ....... H04W 12/37; H04W 4/18; H04W 48/18; G06Q 20/127; H04L 63/205; H04L 5/00
  See application file for complete search history.

(56) References Cited

U.S. PATENT DOCUMENTS

| | | | |
|---|---|---|---|
| 2018/0124647 | A1 | 5/2018 | Dai et al. |
| 2018/0160467 | A1* | 6/2018 | Quan .................... H04W 76/19 |
| 2018/0332649 | A1* | 11/2018 | Fan ........................ H04W 48/20 |
| 2019/0268761 | A1 | 8/2019 | Hong |
| 2019/0380068 | A1* | 12/2019 | Jost ...................... H04W 12/041 |
| 2020/0323027 | A1* | 10/2020 | Yang ...................... H04W 36/02 |

FOREIGN PATENT DOCUMENTS

| | | |
|---|---|---|
| CN | 106688255 A | 5/2017 |
| CN | 107079382 A | 8/2017 |
| WO | 2017074488 A1 | 5/2017 |
| WO | 2017135860 A1 | 8/2017 |

OTHER PUBLICATIONS

3GPP TS 33.501 V0.4.0 (Oct. 2017), "3rd Generation Partnership Project; Technical Specification Group Services and System Aspects; Security Architecture and Procedures for 5G System (Release 15)," Oct. 2017, 70 pages.
3GPP TS 36.133 V15.0.0 (Sep. 2017), "3rd Generation Partnership Project; Technical Specification Group Radio Access Network; Evolved Universal Terrestrial Radio Access (E-UTRA); Requirements for support of radio resource management (Release 15)," Sep. 2017, 2,663 pages.
3GPP TS 36.211 V13.7.1 (Sep. 2017), "3rd Generation Partnership Project; Technical Specification Group Radio Access Network; Evolved Universal Terrestrial Radio Access (E-UTRA); Physical channels and modulation (Release 13)," Sep. 2017, 172 pages.
3GPP TS 36.331 V12.15.1 (Sep. 2017), "3rd Generation Partnership Project; Technical Specification Group Radio Access Network; Evolved Universal Terrestrial Radio Access (E-UTRA); Radio Resource Control (RRC); Protocol specification (Release 12)," Sep. 2017, 459 pages.
3GPP TS 38.331 V0.1.0 (Oct. 2017), "3rd Generation Partnership Project; Technical Specification Group Radio Access Network; NR; Radio Resource Control (RRC); Protocol specification (Release 15)," Oct. 2017, 42 pages.
Ericsson, "UE network identifier impacts on LTE connected to 5GC," 3GPP TSG-RAN WG2 #99bis, R2-1710193 Prague, Czech Republic, Oct. 9-13, 2017, 4 pages.
Huawei, HiSilicon, "NR PDCP configuration for SRB in E-UTRA connected to 5GC," 3GPP TSG-RAN WG2 Meeting #100, R2-1713134, Reno, USA, Nov. 27-Dec. 1, 2017, 6 pages.
Huawei, HiSilicon, "NRPDCP for SRB for a UE accessing 5GC via ng-eNB," 3GPP TSG-RAN WG2 Meeting #99bis, R2-171 1110, Prague, Czech Republic, Oct. 9-13, 2017, 4 pages.
Huawei, HiSilicon, "Support of 5GS security in E-UTRA connected to 5GC," 3GPP TSG-RAN WG2 Meeting #100, R2-1713136, Reno, USA, Nov. 27-Dec. 1, 2017, 3 pages.
Office Action issued in Chinese Application No. 201711148984.8 dated Jan. 6, 2020, 16 pages (with English translation).
Qualcomm Incorporated, "Type of PDCP Protocol Adoption for E-UTRAN connected to 5GCN",, 3GPP TSG-RAN2 Meeting #99bis, R2-1710160, Prague, Czech Republic, Oct. 9-13, 2017, 6 pages.
3GPP TS 38.300 V1.2.0 (Nov. 2017), "3rd Generation Partnership Project;Technical Specification Group Radio Access Metwork;NR; NR and NG-RAN Overall Description;Stage 2(Release 15)," Nov. 2017, 60 pages.
Office Action issued in Indian Application No. 202047023520 dated Nov. 8, 2021, 7 pages.

\* cited by examiner

NETWORK ACCESS METHOD, TERMINAL DEVICE, AND NETWORK DEVICE

CROSS-REFERENCE TO RELATED APPLICATIONS

This application is a continuation of International Application No. PCT/CN2018/109177, filed on Sep. 30, 2018, which claims priority to Chinese Patent Application No. 201711148984.8, filed on Nov. 17, 2017. The disclosures of the aforementioned applications are hereby incorporated by reference in their entireties.

TECHNICAL FIELD

This application relates to the communications field, and more specifically, to a network access method, a terminal device, and a network device.

BACKGROUND

With development of communications technologies, a long term evolution (Long Term Evolution, LTE) system may evolve into a next generation LTE (Next Generation LTE, NG-LTE) system. In the NG-LTE system, an ng-eNB (Next Generation evolved nodeB, ng-eNB) provides, for user equipment (User Equipment, UE), a service of accessing a 5th generation core network (5th Generation Core Network, 5G CN or 5GC). In addition, the ng-eNB may further provide, for the user equipment, a service of accessing an evolved packet core (Evolved Packet Core, EPC) network of a 4th generation mobile communications technology (4th Generation Mobile Communication Technology, 4G). The LTE eNB and the UE use an LTE packet data convergence protocol (Packet Data Convergence Protocol, PDCP) for a signaling radio bearer (Signaling Radio Bearer 1, SRB 1) by default. When the user equipment accesses the 5th generation core network by using the ng-eNB, the UE and the ng-eNB need to synchronously change PDCP versions (version). Otherwise, if PDCP versions of a sending party and a receiving party are different, the receiving party cannot correctly parse content of a data packet.

SUMMARY

This application provides a network access method, a terminal device, and a network device, so that the terminal device and the network device can synchronously change PDCP versions, to enable a sending party and a receiving party to correctly parse content of received data packets.

According to a first aspect, a network access method is provided. The method is performed by a terminal device, and includes: sending a first message to a network device, where the first message includes first indication information, and the first indication information is used to indicate a type of a core network to be accessed by the terminal device; receiving a second message sent by the network device, using a packet data covergence protocol for the second message, wherein version of the packet data convergence protocol is corresponding to the type of the core network, and using a first packet data convergence protocol PDCP for the second message when the first indication information is used to indicate that the type of the core network to be accessed by the terminal device is a first core network, or using a second packet data convergence protocol PDCP for the second message when the first indication information is used to indicate that the type of the core network to be accessed by the terminal device is a second core network.

Therefore, in this application, the terminal device sends, to the network device, the type of the core network to be accessed by the terminal device, so that the network device learns of a PDCP that needs to be used by the terminal device to access the type of core network. In this way, the terminal device and the network device can synchronously change PDCP versions, to enable a sending party and a receiving party to correctly parse content of received data packets.

With reference to the first aspect, in some implementations of the first aspect, the first indication information is used to indicate that the type of the core network to be accessed by the terminal device is a first core network, and the method further includes: obtaining bearer configuration information of a first signaling radio bearer after sending the first message to the network device, where the bearer configuration information of the first signaling radio bearer is used to instruct the terminal device to process, by the first PDCP, a message carried in the first signaling radio bearer; and configuring the first signaling radio bearer based on the bearer configuration information of the first signaling radio bearer.

With reference to the first aspect, in some implementations of the first aspect, the obtaining bearer configuration information of the first signaling radio bearer includes: before the second message is received, receiving, by using the first signaling radio bearer, a radio resource control RRC connection reconfiguration message sent by the network device, where the RRC connection reconfiguration message includes the bearer configuration information of the first signaling radio bearer, and the second PDCP is used for the RRC connection reconfiguration message.

With reference to the first aspect, in some implementations of the first aspect, the second message is a security mode command message, the second message includes first security configuration information, and the first security configuration information is used to activate air interface security according to a security mechanism corresponding to the first core network.

With reference to the first aspect, in some implementations of the first aspect, the RRC connection reconfiguration message further includes at least one or a combination of the following information: bearer configuration information of a second signaling radio bearer, bearer configuration information of a data radio bearer, and the first security configuration information.

With reference to the first aspect, in some implementations of the first aspect, the method further includes: before the RRC connection reconfiguration message is received, receiving a security mode command message, where the security mode command message includes at least one or a combination of the following information: the first security configuration information and second security configuration information, where the second PDCP is used for the security mode command message, and the second security configuration information is used to activate air interface security according to a security mechanism corresponding to the second core network.

With reference to the first aspect, in some implementations of the first aspect, the first message is a radio resource control RRC connection setup complete message, and the first message is transmitted via the first signaling radio bearer after being processed by the second PDCP.

With reference to the first aspect, in some implementations of the first aspect, the first message is a message used to request to setup/reestablish/resume a radio resource control RRC connection, and the first message is transmitted via a third signaling radio bearer. For example, the first signaling radio bearer is an SRB 1, the second signaling radio bearer is an SRB 2, and the third signaling radio bearer is an SRB 0.

With reference to the first aspect, in some implementations of the first aspect, the bearer configuration information includes any one or more of the following information: identifier information of a radio bearer, configuration information of the first PDCP, configuration information of a radio link control layer, configuration information of a media access control layer, or configuration information of a logical channel.

With reference to the first aspect, in some implementations of the first aspect, when the first core network is a next generation core network 5GC, the first PDCP is a new radio NR packet data convergence protocol; and when the second core network is an evolved packet core EPC, the second packet data convergence protocol is an E-UTRA packet data convergence protocol.

According to a second aspect, a random access method is provided. The method is performed by a network device, and includes: receiving a first message sent by a terminal device, where the first message includes first indication information, and the first indication information is used to indicate a type of a core network to be accessed by the terminal device; sending a second message to the terminal device, where the second message is sent in a format of a packet data convergence protocol corresponding to the core network, and using a first packet data convergence protocol PDCP for the second message when the first indication information is used to indicate that the type of the core network to be accessed by the terminal device is a first core network, or using a second packet data convergence protocol PDCP for the second message when the first indication information is used to indicate that the type of the core network to be accessed by the terminal device is a second core network.

With reference to the second aspect, in some implementations of the second aspect, the first indication information is used to indicate that the type of the core network to be accessed by the terminal device is the first core network, and the method further includes: before the second message is sent, sending a radio resource control RRC connection reconfiguration message to the terminal device by using a first signaling radio bearer, where the RRC connection reconfiguration message includes bearer configuration information of the first signaling radio bearer, the second PDCP is used for the RRC connection reconfiguration message, and the bearer configuration information of the first signaling radio bearer is used to instruct the terminal device to process, by the first PDCP, a message carried in the first signaling radio bearer.

With reference to the second aspect, in some implementations of the second aspect, the second message is a security mode command message, the second message includes first security configuration information, and the first security configuration information is used to activate air interface security according to a security mechanism corresponding to the first core network.

With reference to the second aspect, in some implementations of the second aspect, the RRC connection reconfiguration message further includes at least one or a combination of the following information: bearer configuration information of a second signaling radio bearer, bearer configuration information of a data radio bearer, and the first security configuration information.

With reference to the second aspect, in some implementations of the second aspect, the method further includes: before the RRC connection reconfiguration message is sent, sending a security mode command message to the terminal device, where the security mode command message includes at least one or a combination of the following information: the first security configuration information and second security configuration information, where the second PDCP is used for the security mode command message, and the second security configuration information is used to activate air interface security according to a security mechanism corresponding to the second core network.

With reference to the second aspect, in some implementations of the second aspect, the first message is a radio resource control RRC connection setup complete message, and the first message is transmitted via the first signaling radio bearer after being processed by the second PDCP.

With reference to the second aspect, in some implementations of the second aspect, the first message is a message used to request to setup/reestablish/resume a radio resource control RRC connection, and the first message is transmitted via a third signaling radio bearer.

With reference to the second aspect, in some implementations of the second aspect, the bearer configuration information includes any one or more of the following information: identifier information of a radio bearer, configuration information of the first PDCP, configuration information of a radio link control layer, configuration information of a media access control layer, and configuration information of a logical channel.

With reference to the second aspect, in some implementations of the second aspect, when the first core network is a next generation core network 5GC, the first PDCP is a new radio NR packet data convergence protocol; and when the second core network is an evolved packet core EPC, the second packet data convergence protocol is an E-UTRA packet data convergence protocol.

According to a third aspect, a network access method is provided. The method is performed by a terminal device, and includes: sending a first message to a network device, where the first message includes first indication information, and the first indication information is used to indicate a type of a core network to be accessed by the terminal device; and receiving a second message sent by the network device, where the second message is sent in a format of a packet data convergence protocol corresponding to the type of the core network.

Therefore, in this application, the terminal device sends, to the network device, the type of the core network to be accessed by the terminal device, so that the network device learns of a PDCP that needs to be used by the terminal device to access the type of core network. In this way, the terminal device and the network device can synchronously change PDCP versions, to enable a sending party and a receiving party to correctly parse content of received data packets.

With reference to the third aspect, in some implementations of the third aspect, using a first packet data convergence protocol PDCP for the second message when the first indication information is used to indicate that the type of the core network to be accessed by the terminal device is a first core network, or using a second packet data convergence protocol PDCP for the second message when the first indication information is used to indicate that the type of the core network to be accessed by the terminal device is a second core network.

With reference to the third aspect, in some implementations of the third aspect, the first message is a radio resource control RRC connection setup complete message, and the first message is sent on a first signaling radio bearer after being processed by the second PDCP.

With reference to the third aspect, in some implementations of the third aspect, when the first indication information is used to indicate that the type of the core network to be accessed by the terminal device is the first core network, the second message is a security mode command message, and the method further includes: after the first message is sent to the network device, obtaining reconfiguration information of the first signaling radio bearer, where the reconfiguration information of the first signaling radio bearer is used to indicate that a PDCP of the first signaling radio bearer is the first packet data convergence protocol; and configuring the PDCP based on the reconfiguration information.

With reference to the third aspect, in some implementations of the third aspect, the obtaining reconfiguration information of the first signaling radio bearer includes: after the first message is sent to the network device, receiving, by using the first signaling radio bearer, a first RRC connection reconfiguration message sent by the network device, where the first RRC connection reconfiguration message includes the reconfiguration information of the first signaling radio bearer.

With reference to the third aspect, in some implementations of the third aspect, the reconfiguration information of the first signaling radio bearer includes any one or more of the following information: identifier information of the first signaling radio bearer, configuration information of a first packet data convergence protocol layer, configuration information of a radio link control layer, configuration information of a media access control layer, and configuration information of an LC.

With reference to the third aspect, in some implementations of the third aspect, the configuring the PDCP based on the reconfiguration information includes: releasing a first packet data convergence protocol of the first signaling radio bearer, and establishing a second packet data convergence protocol of the first signaling radio bearer.

With reference to the third aspect, in some implementations of the third aspect, after the PDCP is configured based on the reconfiguration information of the first signaling radio bearer, a first RRC connection reconfiguration complete message is sent to the network device, and the first RRC connection reconfiguration complete message uses a format of the first packet data convergence protocol.

With reference to the third aspect, in some implementations of the third aspect, a start SN number of the NR packet data convergence protocol layer is set to 0; or if the terminal device stores the first SN number that is not used before a corresponding LTE packet data convergence protocol of the first signaling radio bearer is released, a start SN number of the NR packet data convergence protocol layer is set to the first SN number that is not used.

With reference to the third aspect, in some implementations of the third aspect, using the first packet data convergence protocol for the second message, the second message further includes first air interface security configuration information, and the first air interface security configuration information is information that is used to activate air interface security and that corresponds to the first core network.

With reference to the third aspect, in some implementations of the third aspect, air interface security is configured based on the configuration information for activating air interface security.

With reference to the third aspect, in some implementations of the third aspect, the method further includes: receiving a second RRC connection reconfiguration message, where the second RRC connection reconfiguration message is used to reconfigure the first signaling radio bearer, configure a second signaling radio bearer, and configure a data bearer, and the second RRC connection reconfiguration message is further used to instruct the terminal device to configure a packet data convergence protocol of the first signaling radio bearer as the first packet data convergence protocol; and configuring the PDCP based on the second RRC connection reconfiguration message.

With reference to the third aspect, in some implementations of the third aspect, the configuring the PDCP based on the reconfiguration information includes: releasing the first packet data convergence protocol of the first signaling radio bearer, and establishing a second packet data convergence protocol of the first signaling radio bearer.

With reference to the third aspect, in some implementations of the third aspect, the second RRC connection reconfiguration message includes any one or more of the following information: identifier information of a first radio bearer, configuration information of the NR packet data convergence protocol layer, the configuration information of the radio link control layer, the first air interface security configuration information, the configuration information of the media access control layer, and the configuration information of the LC.

With reference to the third aspect, in some implementations of the third aspect, the method further includes: receiving a security mode command message sent by the network device, using the second packet data convergence protocol for the security mode command message, the security mode command message includes first air interface security configuration information and second air interface security configuration information, the first air interface security configuration information is information that is used to activate air interface security and that corresponds to the first core network, and the second air interface security configuration information is information that is used to activate air interface security and that corresponds to the second core network.

With reference to the third aspect, in some implementations of the third aspect, the first message is a radio resource control RRC connection reestablishment request message, the first indication information is used to indicate a cell identifier of an original cell accessed by the terminal device and/or a terminal device identifier of the terminal device in the original cell, the second message is a third RRC connection reconfiguration message, and the second message is used to configure the second signaling radio bearer and/or the data bearer.

With reference to the third aspect, in some implementations of the third aspect, after the first message is sent to the network device, an RRC connection reestablishment message sent by the network device is received, and the RRC connection reestablishment message is used to indicate that the packet data convergence protocol of the first signaling radio bearer is configured as the first packet data convergence protocol.

With reference to the third aspect, in some implementations of the third aspect, the RRC connection reestablishment message includes any one or more of the following information: the identifier information of the first radio bearer, the configuration information of the radio link control layer, the configuration information of the media access control layer, the first air interface security configuration information, and the configuration information of the LC.

With reference to the third aspect, in some implementations of the third aspect, based on the RRC connection reestablishment message, the corresponding LTE packet data convergence protocol of the first signaling radio bearer is released, and a corresponding NR packet data convergence protocol of the first signaling radio bearer is established; and air interface security is configured based on the first air interface security configuration information.

With reference to the third aspect, in some implementations of the third aspect, the first air interface configuration security information includes any one or more of the following information: first core network security mechanism indication information, an air interface encryption algorithm, an air interface integrity protection algorithm, an air interface control plane encryption algorithm, an air interface user plane encryption algorithm, an air interface control plane integrity protection algorithm, an air interface user plane integrity protection algorithm, and indication information indicating whether an air interface user plane integrity protection function is enabled.

With reference to the third aspect, in some implementations of the third aspect, when the first core network is a next generation core network, the first packet data convergence protocol is a next generation packet data convergence protocol; and when the second core network is a long term evolution LTE system, the second packet data convergence protocol is an LTE packet data convergence protocol.

According to a fourth aspect, a network access method is provided. The method is performed by a network device, and includes: receiving a first message sent by a terminal device, where the first message includes first indication information, and the first indication information is used to indicate a type of a core network to be accessed by the terminal device; and sending a second message to the terminal device, where the second message is sent in a format of a packet data convergence protocol corresponding to the core network.

With reference to the fourth aspect, in some implementations of the fourth aspect, using a first packet data convergence protocol PDCP for the second message when the first indication information is used to indicate that the type of the core network to be accessed by the terminal device is a first core network, or using a second packet data convergence protocol PDCP for the second message when the first indication information is used to indicate that the type of the core network to be accessed by the terminal device is a second core network.

With reference to the fourth aspect, in some implementations of the fourth aspect, the first message is a radio resource control RRC connection setup complete message, and the first message is sent on a first signaling radio bearer after being processed by the second PDCP.

With reference to the fourth aspect, in some implementations of the fourth aspect, when the first indication information is used to indicate that the type of the core network to be accessed by the terminal device is the first core network, the second message is a security mode command message, and the method further includes: after the first message sent by the terminal device is received, sending a first RRC connection reconfiguration message to the terminal device by using the first signaling radio bearer, where the first RRC connection reconfiguration message includes reconfiguration information of the first signaling radio bearer.

With reference to the fourth aspect, in some implementations of the fourth aspect, the reconfiguration information of the first signaling radio bearer includes any one or more of the following information: identifier information of the first signaling radio bearer, configuration information of a first packet data convergence protocol layer, configuration information of a radio link control layer, configuration information of a media access control layer, and configuration information of an LC.

With reference to the fourth aspect, in some implementations of the fourth aspect, using the first packet data convergence protocol for the second message, the second message further includes first air interface security configuration information, and the first air interface security configuration information is information that is used to activate air interface security and that corresponds to the first core network.

With reference to the fourth aspect, in some implementations of the fourth aspect, the method further includes: sending a second RRC connection reconfiguration message to the terminal device, where the second RRC connection reconfiguration message is used to reconfigure the first signaling radio bearer, configure a second signaling radio bearer, and configure a data bearer, and the second RRC connection reconfiguration message is further used to instruct the terminal device to configure a packet data convergence protocol of the first signaling radio bearer as the first packet data convergence protocol.

With reference to the fourth aspect, in some implementations of the fourth aspect, the second RRC connection reconfiguration message includes any one or more of the following information: identifier information of a first radio bearer, the configuration information of the first packet data convergence protocol layer, the configuration information of the radio link control layer, the first air interface security configuration information, the configuration information of the media access control layer, and the configuration information of the LC.

With reference to the fourth aspect, in some implementations of the fourth aspect, the method further includes: sending a security mode command message to the terminal device, using the second packet data convergence protocol for the security mode command message, the security mode command message includes first air interface security configuration information and second air interface security configuration information, the first air interface security configuration information is information that is used to activate air interface security and that corresponds to the first core network, and the second air interface security configuration information is information that is used to activate air interface security and that corresponds to the second core network.

With reference to the fourth aspect, in some implementations of the fourth aspect, the first message is a radio resource control RRC connection reestablishment request message, the first indication information is used to indicate a cell identifier of an original cell accessed by the terminal device and/or a terminal device identifier of the terminal device in the original cell, the second message is a third RRC connection reconfiguration message, and the second message is used to configure the second signaling radio bearer and/or the data bearer.

With reference to the fourth aspect, in some implementations of the fourth aspect, the method further includes:

after the first message sent by the terminal device is received, sending an RRC connection reestablishment message to the terminal device, where the RRC connection reestablishment message is used to indicate that the packet data convergence protocol of the first signaling radio bearer is configured as the first packet data convergence protocol.

With reference to the fourth aspect, in some implementations of the fourth aspect, the RRC connection reestablishment message includes any one or more of the following information: the identifier information of the first radio bearer, the configuration information of the radio link control layer, the configuration information of the media access control layer, the first air interface security configuration information, and the configuration information of the LC.

With reference to the fourth aspect, in some implementations of the fourth aspect, the first air interface security configuration information includes any one or more of the following information: first security mechanism indication information, an air interface encryption algorithm, an air interface integrity protection algorithm, an air interface control plane encryption algorithm, an air interface user plane encryption algorithm, an air interface control plane integrity protection algorithm, an air interface user plane integrity protection algorithm, and indication information indicating whether an air interface user plane integrity protection function is enabled.

With reference to the fourth aspect, in some implementations of the fourth aspect, when the first core network is a next generation core network, the first packet data convergence protocol is a next generation packet data convergence protocol; and when the second core network is a long term evolution LTE system, the second packet data convergence protocol is an LTE packet data convergence protocol.

According to a fifth aspect, a terminal device is provided, includes a sending module and a receiving module, and may perform the method in any one of the first aspect or the optional implementations of the first aspect and the method in any one of the third aspect or the optional implementations of the third aspect.

According to a sixth aspect, a network device is provided, includes a receiving module and a sending module, and may perform the method in any one of the second aspect or the optional implementations of the second aspect and the method in any one of the fourth aspect or the optional implementations of the fourth aspect.

According to a seventh aspect, a chip system is provided, and includes at least one processor. The at least one processor is configured to execute a stored instruction, so that a terminal device can perform the method in any one of the first aspect or the optional implementations of the first aspect and the method in any one of the third aspect or the optional implementations of the third aspect.

According to an eighth aspect, a chip system is provided, and includes at least one processor. The at least one processor is configured to execute a stored instruction, so that a network device can perform the method in any one of the second aspect or the optional implementations of the second aspect and the method in any one of the fourth aspect or the optional implementations of the fourth aspect.

According to a ninth aspect, a computer program product is provided, the computer program product includes an instruction, and when the instruction is executed, the terminal device is enabled to perform the method in any one of the first aspect or the optional implementations of the first aspect and the method in any one of the third aspect or the optional implementations of the third aspect.

According to a tenth aspect, a computer program product is provided, the computer program product includes an instruction, and when the instruction is executed, a network device is enabled to perform the method in any one of the second aspect or the optional implementations of the second aspect and the method in any one of the fourth aspect or the optional implementations of the fourth aspect.

According to an eleventh aspect, a computer storage medium is provided, the computer storage medium stores a program instruction, and when the instruction is executed, a terminal device is enabled to perform the method in any one of the first aspect or the optional implementations of the first aspect and the method in any one of the third aspect or the optional implementations of the third aspect.

According to a twelfth aspect, a computer storage medium is provided, the computer storage medium stores a program instruction, and when the instruction is executed, the network device is enabled to perform the method in any one of the second aspect or the optional implementations of the second aspect and the method in any one of the fourth aspect or the optional implementations of the fourth aspect.

According to a thirteenth aspect, a communications apparatus is provided, and includes a memory and a processor. The memory stores program code that can be used to instruct to perform any one of the first aspect or the optional implementations of the first aspect and any one of the third aspect or the optional implementations of the third aspect. When the program code is executed, the processor may implement operations performed by the terminal device in the foregoing methods.

According to a fourteenth aspect, a communications apparatus is provided, and includes a memory and a processor. The memory stores program code that can be used to instruct to perform any one of the second aspect or the optional implementations of the second aspect and any one of the fourth aspect or the optional implementations of the fourth aspect. When the program code is executed, the processor may implement operations performed by the network device in the foregoing methods.

DESCRIPTION OF EMBODIMENTS

The following describes technical solutions of this application with reference to accompanying drawings.

Figure 1:
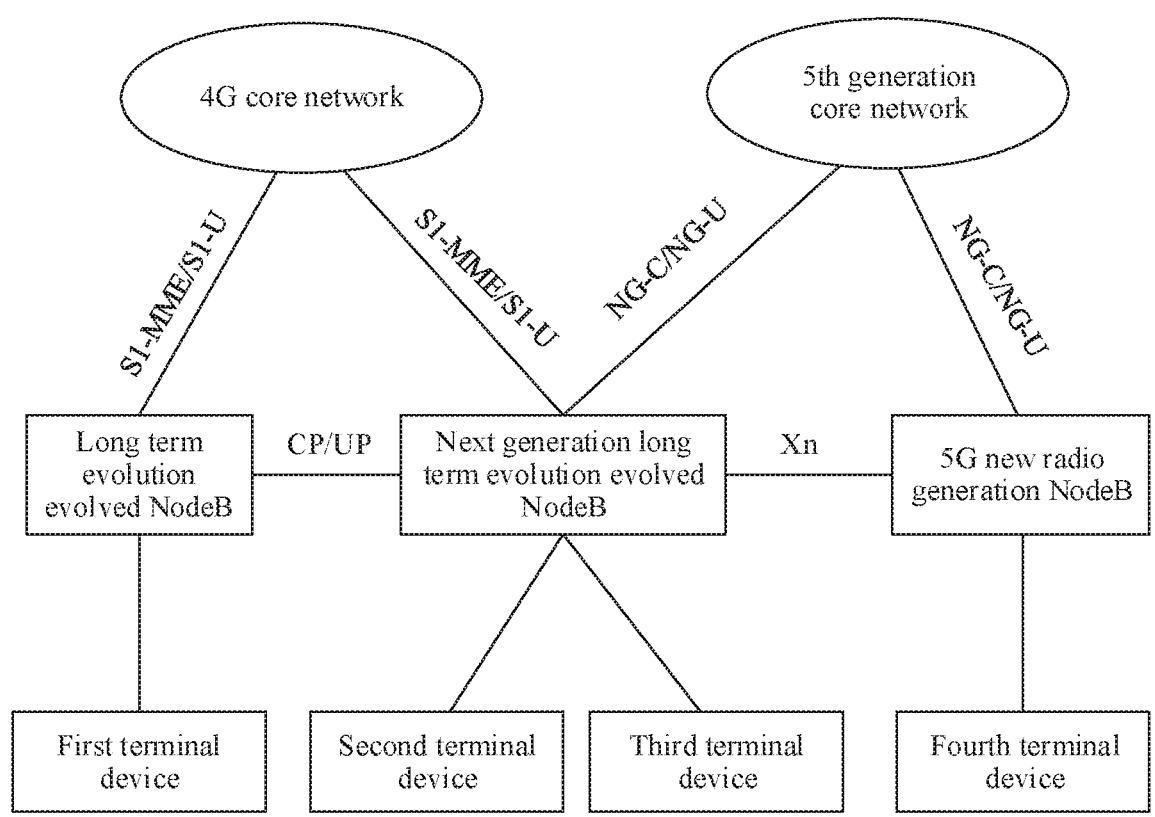
FIG. 1 is a schematic diagram of a communications system for a network access method and a device according to this application.

FIG. 1 is a schematic diagram of a communications system for a network access method and a device according to this application.

As shown in FIG. 1, a first terminal device accesses an EPC by using a long term evolution evolved NodeB (Long Term Evolution nodeB, LTE eNB), a second terminal device accesses the EPC by using a next generation long term evolution evolved NodeB (Next Generation Long Term Evolution evolved node B. NG-LTE ng-eNB), a third terminal device accesses a 5GC by using the NG-LTE ng-eNB, and a fourth terminal device accesses the 5GC by using a 5G new radio generation NodeB (New Radio Generation node B, NR gNB). The NR gNB provides both control plane transmission and user plane transmission for the fourth terminal device, and the fourth terminal device further accepts a user plane service of the NG-LTE ng-eNB. Data sent by the NG-LTE ng-eNB to the fourth terminal device may be directly from the 5GC. In this case, a user plane interface (for example, an NG-U interface) is required between the ng-eNB and the 5GC. Alternatively, data sent by the ng-eNB to UE is directly from the NR-gNB (for example, through an Xn interface). It should be noted that this application is not limited to future network deployment in which the 5GC and the EPC coexist. For example, if the EPC does not exist, a terminal device may access only the 5GC. This application is not limited to UE that has a capability of accessing only one core network. For example, the third terminal device and the fourth terminal device may further have a capability of accessing the EPC. In addition, this application is not limited to a terminal device that has only one air interface capability. For example, the third terminal device and the fourth terminal device may support both NR and LTE/NG-LTE air interface access technologies.

Figure 2A:
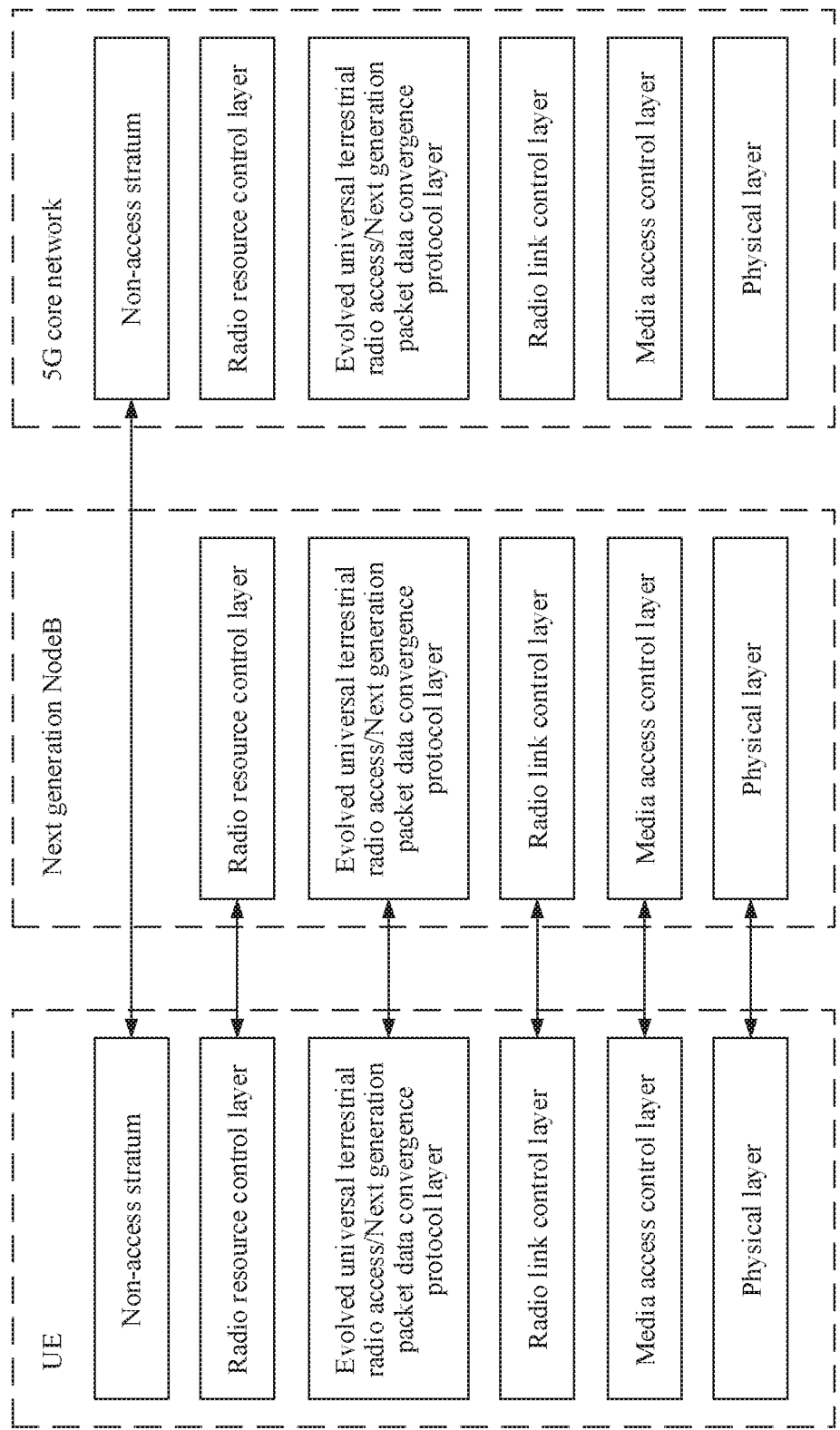
FIG. 2a and FIG. 2b are a schematic block diagram of a control plane and a user plane according to this application.
Figure 2B:
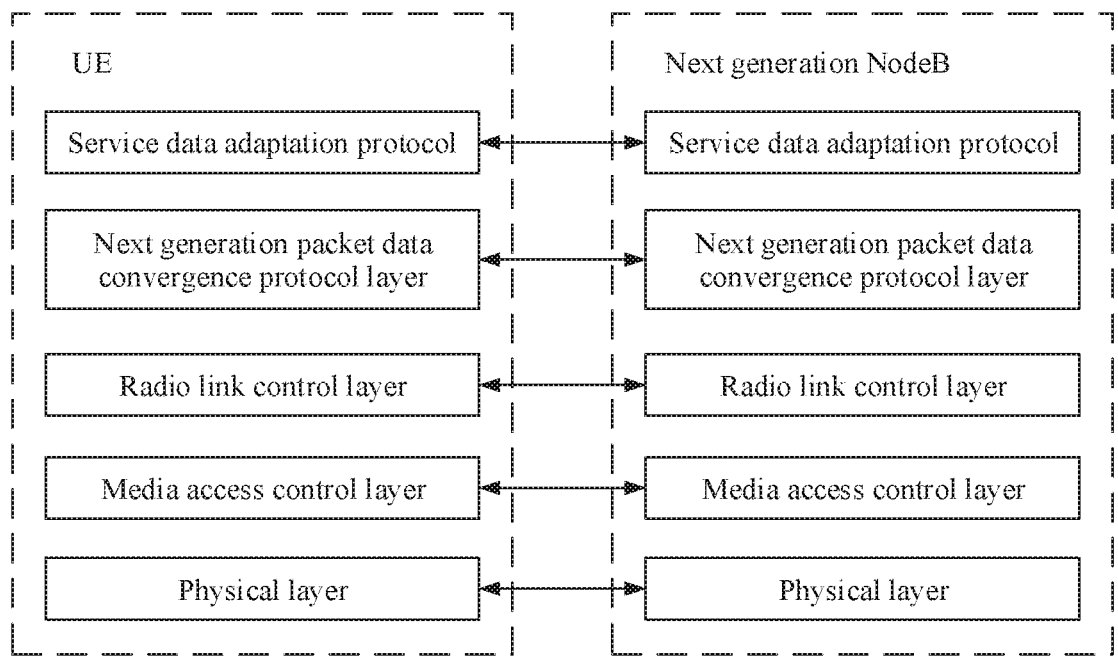

In a scenario in which the terminal device accesses the 5GC by using the ng-eNB, because some functions and mechanisms that are not completely the same as those in 4G are introduced in a 5G system, the terminal device that accesses the 5GC is instructed to work by using some NR protocol layers. For example, FIG. 2a shows a control plane protocol stack in which the UE accesses the 5GC by using the ng-eNB, and FIG. 2b shows a user plane protocol stack in which the UE accesses the 5GC by using the ng-eNB. On a user plane, the terminal device that accesses the 5GC by using the ng-eNB uses only an NR PDCP. To be specific, a protocol stack of the user plane terminal device includes the service data adaptation protocol (Service data adaptation protocol. SDAP), the NR PDCP, a radio link control (radio link control, RLC) layer, a media access control (media access control, MAC) layer, and a physical layer (physical layer. PHY). An SDAP layer is used to map a data flow at a QoS flow granularity to an air interface DRB for the terminal device in the 5GC. This protocol layer is applicable to a scenario in which the terminal device accesses the 5GC by using the ng-eNB/gNB. On a control plane, a protocol stack of the control plane terminal device includes a radio resource control (radio resource control, RRC) layer, an LTE packet data convergence protocol (packet data convergence protocol, PDCP) and/or an NR PDCP, a radio link control RLC layer, a MAC layer, and a physical layer. If the protocol stack of the terminal device has both the LTE PDCP and the NR PDCP, in a possible manner, the terminal device that accesses the 5GC by using the ng-eNB first uses the LTE PDCP to establish an RRC connection, and then uses the NR PDCP to transmit a subsequent SRB 1 and/or SRB 2. An LTE wireless-side access technology is referred to as evolved universal terrestrial radio access (Evolved Universal Terrestrial Radio Access, E-UTRA). Therefore, corresponding to the NR PDCP, the LTE PDCP in this specification is also referred to as an E-UTRA PDCP. It should be noted that, unless otherwise specified, the RLC, the MAC, and the PHY in this specification are all LTE protocol layers.

In an NR-LTE dual connectivity (Dual Connectivity, DC) scenario, the NR-gNB serves as a primary station to provide control plane data transmission and user plane data transmission for the terminal device. Control plane data includes NAS signaling exchanged between the terminal device and the 5GC, and an RRC message for NR air interface radio resource control and management. The NG-LTE ng-eNB serves as a secondary station to provide user plane data transmission for the terminal device. User plane data may be directly from the 5GC, or may be a split flow from the gNB. In addition, the ng-eNB may further establish an RRC connection to the terminal device over an air interface, to transmit an RRC message for air interface radio resource control and management of the ng-eNB, and/or a split flow or a duplication (duplication) from an NR air interface SRB. In this case, a protocol stack used by the terminal device to transmit air interface data in the ng-eNB includes an RRC layer, and a PDCP layer, an RLC layer, a MAC layer, and a PHY layer that are used to transmit an RRC message. In this case, the ng-eNB needs to configure the NR PDCP for an SRB used by the terminal device to transmit the RRC message.

In addition. FIG. 1 is merely a simplified schematic diagram in an example. A network may further include another network device that is not shown in FIG. 1.

The technical solutions of the embodiments of this application may be applied to various communications systems such as a global system for mobile communications (Global System for Mobile Communications, GSM), a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunications System, UMTS), a worldwide interoperability for microwave access (Worldwide Interoperability for Microwave Access, WiMAX) communications system, a future 5th generation (5th Generation, 5G) system, or a new radio (New Radio, NR) system.

The terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, a user apparatus, or the like. Alternatively, the terminal device may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, a vehicle-mounted device, a wearable device, a terminal device in a future 5G network, a terminal device in a future evolved public land mobile network (Public Land Mobile Network, PLMN), or the like. This is not limited in the embodiments of this application.

A network device in the embodiments of this application may be a device configured to communicate with the terminal device. The network device may be a base transceiver station (Base Transceiver Station, BTS) in a global system for mobile communications (Global System for Mobile communication, GSM) or a code division multiple access (Code Division Multiple Access, CDMA) system, or may be a NodeB (NodeB, NB) in a wideband code division multiple access (Wideband Code Division Multiple Access, WCDMA) system, or may be an evolved NodeB (Evolutional NodeB, eNB or eNodeB) in an LTE system, or may be a radio controller in a cloud radio access network (Cloud Radio Access Network, CRAN) scenario. Alternatively, the network device may be a relay node, an access point, a vehicle-mounted device, a wearable device, a network device in a future 5G network, a network device in a future evolved PLMN network, or the like. This is not limited in the embodiments of this application.

It may be understood that, in this application, names of the core network, the network device, and the terminal device are merely examples. When the names are inconsistent with those in this specification, but architectures and functions are the same as those described in this specification, the solutions provided in this specification are also applicable.

Figure 3:
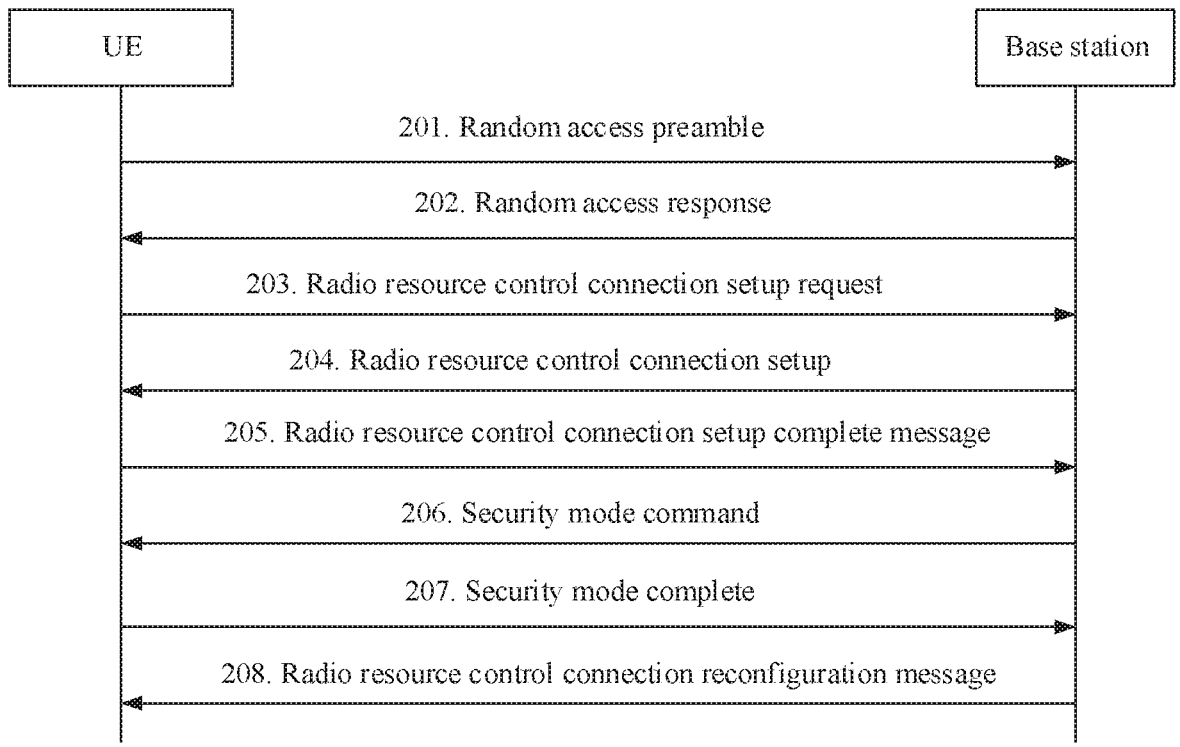
FIG. 3 is a schematic flowchart of a network access method according to this application.

FIG. 3 is a schematic flowchart of a random access method 200. In the prior art, a network device may be referred to as a base station. The following describes a network access process by using an example in which a network device is a base station and a terminal device is UE. As shown in FIG. 3, the method 200 includes the following content.

Step 201: The UE sends a random access preamble (random access preamble). The UE sends the random access preamble to notify the base station that there is a random access request. The random access preamble is transmitted on a physical random access channel (Physical Random Access Channel, PRACH). The base station notifies, by using a broadcast message, the UE of specific time-frequency resources on which the preamble is allowed to be transmitted. Alternatively, for the UE in a handover process, a target base station notifies, by using a handover command (Handover command), the UE of a random access resource and/or a cell radio network temporary identifier (Cell Radio Network Temporary Identifier. C-RNTI) used to perform random access on the target base station.

Step 202: The base station sends a random access response (random access response, RAR). After sending the preamble, the UE monitors a physical downlink control channel (Physical Downlink Control Channel, PDCCH) in a time window of the RAR, to receive the corresponding RAR sent by the base station. If the UE needs to subsequently send a Msg3, an uplink resource indication (UL grant) for sending the Msg3 is added to the RAR.

Step 203: The UE sends the message 3 (Message 3, Msg3). For UE that requests to establish a wireless connection during initial access, the Msg3 carries a radio resource control RRC connection setup request (Connection Setup Request) message. For UE that reestablishes an RRC connection, the Msg3 carries an RRC connection reestablishment request (Connection Reestablishment Request). For handover (based on contention), the Msg3 carries a MAC CE (for example, a C-RNTI MAC Control Element). If a quantity of allocated uplink resources is large enough, the Msg3 may further carry a handover command acknowledgment message (for example, an RRC connection reconfiguration complete message). The UE adds an identifier of the UE to the Msg3 for contention resolution of a message 4 (Message 4, Msg4). For initial access, a system architecture evolution temporary mobile subscriber identity (System Architecture Evolution temporary mobile subscriber identity, S-TMSI) or a random number is carried. During RRC connection reestablishment and handover, the UE adds a cell radio network temporary identifier (Cell Radio Network Temporary Identifier, C-RNTI) to the Msg3. FIG. 2a and FIG. 2b show only a case in which a wireless connection is established during initial access. For initial access and RRC connection reestablishment, the Msg3 is sent by using a signaling radio bearer 0 (Signaling Radio Bearer 0, SRB 0), and no PDCP is configured for the SRB 0.

Step 204: The base station sends the Msg4. In a contention resolution mechanism, the base station adds, to the Msg4, a unique UE identifier added by UE to the Msg3, to specify the UE that wins in contention. Other UE that does not win in contention resolution re-initiates random access. The base station specifies, by sending a PDCCH scrambled by using a C-RNTI or sending a specific MAC CE (for example, a UE contention resolution identity MAC control element). UE that wins. For initial access, the Msg4 carries an RRC connection setup message, including configuration information (for example, including an SRB ID, a radio link control RLC layer configuration, and a logical channel (Logical Channel, LC) configuration) of a signaling radio bearer 1 (Signaling Radio Bearer 1, SRB 1). For RRC connection reestablishment, the Msg4 carries an RRC connection reestablishment message, including configuration information (for example, including an SRB ID, an RLC layer configuration, and an LC configuration) of an SRB 1 and security-related information (for example, a next hop chaining count). After receiving the configuration information of the SRB 1, the UE performs corresponding configuration, and then may send a Msg5 by using the SRB 1. For RRC connection reestablishment, the UE derives an air interface control plane integrity protection (which is referred to as integrity protection for short) key and an air interface control plane and user plane encryption key based on the security-related information. The UE configures the keys for a lower layer (for example, a PDCP layer), so that subsequent SRB 1 messages can be encrypted and integrity-protected. For initial access and RRC connection reestablishment, the Msg4 is sent by using the SRB 0, and no PDCP is configured for the SRB 0.

Step 205: The UE sends the message 5 (Message 5, Msg5). For initial access, the Msg5 carries an RRC connection setup complete (Connection Setup Complete) message, and the message is sent by using the SRB 1. In this case, air interface security is not activated, and the message is not encrypted or integrity-protected. For RRC connection reestablishment, the Msg5 carries an RRC connection reestablishment complete (Connection Reestablishment Complete) message, and the message is sent by using the SRB 1. In this case, air interface security has been activated, and the message is encrypted and integrity-protected.

Step 206: For initial access, to activate air interface security, the base station sends a security mode command (Security Mode Command) message to the UE, where the message carries an algorithm used to derive an air interface control plane integrity protection key and an algorithm used to derive an air interface control plane and user plane encryption key. After receiving the foregoing message, the UE derives a corresponding key by using a corresponding algorithm, and instructs the lower layer to apply the key, so that subsequent messages can be encrypted and integrity-protected. The security mode command message is integrity-protected but not encrypted. After deriving the control plane integrity protection key, the UE instructs the lower layer to perform integrity protection check on the message. It should be noted that, when the UE accesses an EPC by using the base station, the UE derives the key, performs encryption and/or integrity protection on an air interface control plane, and performs encryption and/or integrity protection on an air interface user plane according to a security mechanism of a 4G system (for example, according to a security mechanism specified in the protocol 33.401). When the UE accesses a 5GC by using an LTE eNB, a feasible method is as follows: The UE derives the key, performs encryption and/or integrity protection on an air interface control plane, and performs encryption and/or integrity protection on an air interface user plane according to a security mechanism of a 5G system (for example, according to a security mechanism specified in the protocol 33.501). Another feasible method is as follows: The UE derives the key according to a security mechanism of a 5G system (for example, according to a security mechanism specified in the protocol 33.501), but an algorithm defined in a 4G system is used to derive the key, perform encryption and/or integrity protection on an air interface control plane, and perform encryption and/or integrity protection on an air interface user plane. Still another feasible method is as follows: The UE derives the key, performs encryption and/or integrity protection on an air interface control plane, and performs encryption and/or integrity protection on an air interface user plane according to a security mechanism of a 4G system (for example, according to a security mechanism specified in the protocol 33.401). The security mechanism of the 4G system may be completely or partially the same as or completely different from the security mechanism of the 5G system. This is not limited in this application. The security algorithm of the 4G system may be completely or partially the same as or completely different from a security algorithm of the 5G system. This is not limited in this application.

Step 207: Corresponding to step 206, the UE sends a security mode complete (Security Mode Complete) message to the base station. The message is integrity-protected but not encrypted.

Step 208: After air interface security is activated, the base station may send an RRC connection reconfiguration (Connection Reconfiguration) message to the UE, to configure a signaling radio bearer 2 (Signaling Radio Bearer 2, SRB 2) and a data radio bearer (Data Radio Bearer, DRB). The reconfiguration message is encrypted and integrity-protected. It should be noted herein that if the reconfiguration message is used to configure the SRB 2 and/or the DRB, the message needs to be sent after air interface security is activated.

In an existing LTE system, the LTE eNB and the UE use an LTE PDCP for the SRB 1 by default.

In this application, for example, a first signaling radio bearer is the SRB 1, a second signaling radio bearer is the SRB 2, and a third signaling radio bearer is the SRB 0.

To better understand this application, this application is described below with reference to FIG. 4 to FIG. 13 by using, as an example, a system that is the same as or similar to the system shown in FIG. 1.

Figure 4:
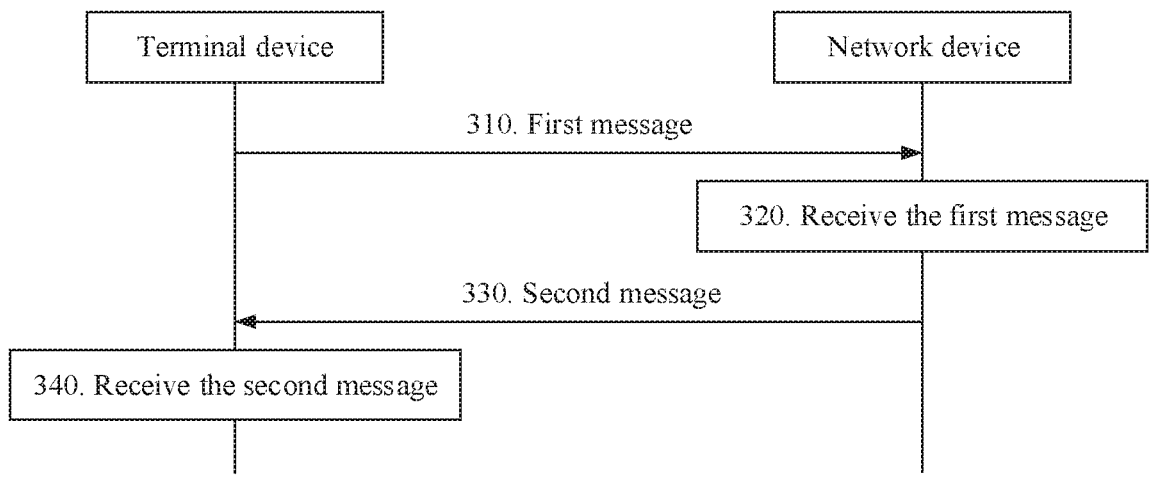
FIG. 4 is a schematic flowchart of a network access method according to this application.

FIG. 4 is a schematic flowchart of a network access method 300 according to this application. The method 300 may be applied to the scenario shown in FIG. 1, or certainly may be applied to another communication scenario. This is not limited in this embodiment of this application. As shown in FIG. 4, the method 300 includes the following content.

Step 310: A terminal device sends a first message to a network device, where the first message includes first indication information, the first indication information is used to indicate a type of a core network to be accessed by the terminal device, and the type of the core network may be a first core network or a second core network.

Step 320: The network device receives the first message sent by the terminal device.

Step 330: The network device sends, to the terminal device, a second message where a packet data convergence protocol is used for the second message, wherein version of the packet data convergence protocol is corresponding to the core network. Specifically, when the first indication information is used to indicate that the type of the core network to be accessed by the terminal device is the first core network, using a first packet data convergence protocol PDCP for the second message; or when the first indication information is used to indicate that the type of the core network to be accessed by the terminal device is the second core network, using a second packet data convergence protocol PDCP for the second message.

Step 340: The terminal device receives the second message sent by the network device, and the terminal device processes the second message by the packet data convergence protocol, wherein version of the packet data convergence protocol is corresponding to the type of the core network. Specifically, when the first indication information is used to indicate that the type of the core network to be accessed by the terminal device is the first core network, using the first packet data convergence protocol PDCP for the second message; or when the first indication information is used to indicate that the type of the core network to be accessed by the terminal device is the second core network, using the second packet data convergence protocol PDCP for the second message.

Optionally, when the first core network is a next generation core network, the first packet data convergence protocol is a next generation PDCP. When the second core network is an EPC, the second packet data convergence protocol is an E-UTRA PDCP (or referred to as an LTE PDCP). For example, the next generation core network is a 5th generation core network, which is briefly referred to as a 5GC. The next generation PDCP is a new radio NR PDCP.

Therefore, in this application, the terminal device sends, to the network device, the type of the core network to be accessed by the terminal device, so that the network device learns of a PDCP version that needs to be used by the terminal device to access the type of core network. In this way, the terminal device and the network device can synchronously change PDCP versions, to enable a sending party and a receiving party to correctly parse content of received data packets.

Specifically, before the terminal device sends the first message to the network device, the method 300 further includes step 201 to step 204 or step 201 and step 202 in the method 200. For understanding, refer to the foregoing prior art.

In addition, optionally, the terminal device obtains information that is about a connection to the 5GC and that is provided by the network device. It should be noted that the information that indicates the connection to the 5GC and that is provided by the network device may be an explicit indication or an implicit indication. For example, the explicit indication may be a clear 5GC connection indication. The implicit indication may be information used by the terminal device to deduce that the network device provides the 5GC connection. For example, the terminal device reads a system message broadcast by the network device, and obtains the carried information that indicates the connection to the 5GC and that is provided by the network device.

The terminal device sends an RRC message to the network device, to request a base station to establish a radio resource control connection. For example, in an initial access scenario, the RRC message is an RRC connection setup request message. The network device sends an RRC response message, to indicate that the radio resource control connection setup request of the terminal device is accepted. For example, in an initial access scenario, the RRC message is an RRC connection setup message. Optionally, the RRC message carries first bearer configuration information of a first signaling radio bearer. Optionally, the first bearer configuration information of the first signaling radio bearer includes any one or a combination of the following information: identifier information of the radio bearer, configuration information of the second PDCP, configuration information of RLC, configuration information of MAC, and configuration information of an LC.

For example, the terminal device applies the first bearer configuration information of the first signaling radio bearer, and processes the RRC message of the first signaling radio bearer by the second PDCP. It should be understood that, in this case, the first signaling radio bearer between the terminal device and the network device has been established, and the terminal device processes the first message by the second PDCP, adds the first message to the first signaling radio bearer, and sends the first signaling radio bearer.

Optionally, the first indication information may be explicit indication information, for example, indicating the EPC or the 5GC, or the first indication information may be implicit indication information. For example, the first indication information is included in a UE ID (for example, 5G-S-TMSI indicates that a CN type is the 5GC), or is included in a core network node ID (for example, an AMF ID, an AMF group ID, an AMF pointer, and an AMF set ID in this message all indicate that a CN type is the 5GC).

Optionally, the first indication information indicates that the type of the core network to be accessed by the terminal device is the first core network, and the method 300 further includes: The terminal device obtains second bearer configuration information of the first signaling radio bearer after sending the first message to the network device, where the second bearer configuration information is used to instruct the terminal device to process, by the first PDCP, a message carried in the first signaling radio bearer. The terminal device configures the first signaling radio bearer based on the second bearer configuration information of the first signaling radio bearer. Optionally, the second bearer configuration information includes any one or more of the following information: the identifier information of the radio bearer, configuration information of the first PDCP, the configuration information of RLC, the configuration information of MAC, and the configuration information of the LC.

This application includes both random access during initial access and initial access during connection reestablishment. The following describes a random access process during initial access.

It should be understood that, for ease of description, in this application, descriptions are provided by using an example in which the first core network is the 5GC, the first packet data convergence protocol is the NR PDCP, the second core network is the EPC, and the second packet data convergence protocol is the LTE PDCP.

Optionally, the obtaining second bearer configuration information of the first signaling radio bearer includes: before receiving the second message, receiving, by the terminal device by using the first signaling radio bearer, a radio resource control RRC connection reconfiguration message sent by the network device, where the RRC connection reconfiguration message includes the second bearer configuration information of the first signaling radio bearer, and the terminal device processes the received RRC connection reconfiguration message by the second PDCP. Optionally, encryption and integrity protection are not performed on the RRC connection reconfiguration message. For example, the terminal device processes the RRC connection reconfiguration message by the LTE PDCP.

Optionally, the terminal device automatically obtains the second bearer configuration information of the SRB 1. For example, a specific configuration value of the second bearer configuration information of the SRB 1 is defined in a related protocol (for example, 3GPP TS36.331 and/or 3GPP TS38.331). The terminal device uses the value as a default value.

For example, the second bearer configuration information includes any one or more of the following information: the identifier information of the radio bearer, configuration information of the NR PDCP, the configuration information of RLC, the configuration information of MAC, and the configuration information of the LC.

Optionally, the configuration information of the NR PDCP may include one or a combination of the following information: identifier information of the first signaling radio bearer, an SN number length, an indication indicating whether an on-demand delivery function is activated, an indication indicating whether a reordering function is activated, an indication indicating whether a duplicate packet detection function is activated, an indication indicating whether a duplication (duplication) function is activated, a reordering window value (for example, Window_Size), a timer (for example, t-Reordering) used for reordering, and a timer (discard Timer) used for discarding. For example, the first signaling radio bearer is the SRB 1, and an identifier of the radio bearer corresponds to the SRB 1.

Optionally, the specific configuration information of the NR PDCP may be specified as an explicit (explicit) value or a default value. The default value may be specified in a protocol, and does not need to be carried in an air interface message. Optionally, the configuration information of the NR PDCP is defined in an LTE protocol (for example, 36.331). Alternatively, optionally, the configuration information of the NR PDCP is carried in the RRC connection reconfiguration message in a form of a container (container). Optionally, the configuration information of the NR PDCP is defined in an NR protocol (for example, 38.331). The configuration information of RLC may include one or a combination of the following configuration information of LTE RLC when the NR PDCP is used: an indication indicating whether an RLC entity is reestablished (reestablish), an indication indicating whether an RLC entity is kept in a current state, an SN number length, uplink t-Poll retransmit, an uplink poll PDU, an uplink poll byte, an uplink maximum reselection threshold (for example, maxRetx Threshold), downlink reordering timer (for example, t-Reordering), and a downlink status report timer (for example, t-Status Prohibit). The configuration information of MAC may include any one or a combination of the following configuration information of MAC when the NR PDCP is used: an indication indicating whether MAC is reset (reset) and main MAC configuration (for content, refer to a MAC-Main Config information element in 36.331). The configuration information of the LC may include any one or a combination of the following configuration information of the LC when the NR PDCP is used: identifier information of the LC, an uplink sending priority, an uplink prioritized bit rate (for example, a prioritized bit rate), an uplink token bucket size (for example, bucket size duration), and a logical channel group identifier.

Specifically, after the terminal device sends the RRC connection setup complete message, when the message carries information used to indicate that the type of the CN to be accessed by the terminal device is the 5GC, the terminal device releases the LTE PDCP of the SRB 1, and establishes a new NR PDCP for the SRB 1. Optionally, the terminal device obtains configuration information of the SRB 1 to configure the SRB 1. Optionally, the configuration information of the SRB 1 includes one or a combination of the following information: configuration information of the NR PDCP, the configuration information of RLC, the configuration information of MAC, and the configuration information of the LC. For example, a start SN number of the NR PDCP is set to 0. Alternatively, optionally, the terminal device stores the first SN number that is not used before the LTE PDCP is released, and after the terminal device establishes the NR PDCP for the SRB 1, a start SN number of the NR PDCP is set to the stored first SN number that is not used before the LTE PDCP is released. For example, if the indication information that is included in the configuration information of RLC and that indicates whether the RLC entity is reestablished (reestablish) instructs the terminal device to reestablish the RLC entity for the SRB 1. RLC reestablishment is performed according to an RLC protocol specification. For example, if the indication information that is included in the configuration information of RLC and that indicates whether the RLC entity is kept in a current state instructs the terminal device to keep the RLC entity for the SRB 1, the terminal device does not interrupt current RLC work, does not discard a packet in an RLC buffer, but continues transmission and retransmission according to an RLC protocol specification. Optionally, the configuration information of the NR PDCP in the configuration information of the SRB 1 is carried in a system message of the network device, or is specified (for example, in a form of a default configuration value) in a related protocol (for example, the LTE protocol 36.331). Optionally, any one or a combination of the configuration information of RLC, the configuration information of MAC, and the configuration information of the LC in the configuration information of the SRB 1 may be specified (for example, in a form of a default configuration value) in a related protocol (for example, the LTE protocol 36.331), or may be carried in the RRC connection setup message. Alternatively, a protocol specifies whether to continue to use an original configuration (for example, an RLC configuration and/or an LC configuration) of the SRB 1, and whether to interrupt current work of a current related protocol layer, for example, whether to reestablish an RLC entity, and/or whether to reset MAC. Optionally, unless otherwise specified, when the terminal device sends a subsequent RRC message and receives a subsequent RRC message by using the SRB 1, the NR PDCP is used for processing.

It should be specially noted that behavior of applying the NR PDCP by the terminal device to the SRB 1 should be synchronized with that of the network device. In other words, both the terminal device and the network device use the NR PDCP as a PDCP for sending the SRB 1. Otherwise, if a type and a configuration of a PDCP used by the network device for the SRB 1 are inconsistent with those of a PDCP used by the UE, a message sent by a peer party cannot be correctly parsed. The RRC connection setup complete message sent by the terminal device may be retransmitted. For example, the network device requests the terminal device for retransmission if the network device fails to receive the message. Retransmission may occur at a MAC layer. For example, the network device feeds back a HARQ NACK. Alternatively, retransmission may occur at an RLC layer. For example, an RLC status report fed back by the network device indicates that the message is not correctly received. Therefore, in a feasible manner, the LTE PDCP of the SRB 1 is released and the new NR PDCP is established for the SRB 1 only after the terminal device sends the RRC connection setup complete message and determines that the network device correctly receives the message. Optionally, if a HARQ ACK fed back by the network device and received by the UE and/or an RLC status report fed back by the network device and received by the terminal device indicate/indicates that the network device correctly receives an RLC PDU corresponding to the message, the terminal device determines that the network device correctly receives the message. Further, optionally, the terminal device may reestablish RLC of the SRB 1 and/or reset MAC. In another feasible manner, before changing a type of the PDCP for the SRB 1, the terminal device does not need to wait to determine that the network device correctly receives the RRC connection setup complete message. In other words, after sending the RRC connection setup complete message, the UE may immediately release the LTE PDCP of the SRB 1 and establish the new NR PDCP for the SRB 1. However, the terminal device needs to maintain a data packet in an RLC buffer and/or a MAC buffer of the SRB 1. In other words, the terminal device cannot reestablish RLC of the SRB 1 and/or reset MAC, to prevent the network device from requesting retransmission.

It should be understood that, for a method in which the terminal device receives the radio resource control RRC connection reconfiguration message, and reconfigures the SRB 1 based on the RRC connection reconfiguration message, refer to the method in which the terminal device obtains the bearer configuration information that is of the first signaling radio bearer and that is stored by the terminal device, and reconfigures the SRB 1.

Optionally, the second message is a security mode command message, the second message includes first security configuration information, and the first security configuration information is used to activate air interface security according to a security mechanism corresponding to the first core network.

Specifically, because the RRC connection setup complete message carries information used to indicate that the terminal device is to access the 5GC, the network device needs to configure, for the terminal device, information required for activating an air interface security mechanism corresponding to a 5G system. For example, the first security configuration information included in the security mode command message includes any one or more of the following information: a 5G security mechanism indication, an air interface encryption algorithm, an air interface integrity protection algorithm, an air interface control plane encryption algorithm, an air interface user plane encryption algorithm, an air interface control plane integrity protection algorithm, an air interface user plane integrity protection algorithm, and an indication indicating whether an air interface user plane integrity protection function is enabled. The 5G security mechanism indication is used to indicate that other information included in the information required for activating air interface security is a security parameter of the 5G system. For example, the information required for activating air interface security is an information element extended based on the original security mode command, and the terminal device that is to access the 5GC reads the information element to obtain the information required for activating air interface security. Alternatively, whether a parameter included in the information required for activating air interface security is a security parameter of the 5G system needs to be specified. Alternatively, the UE considers by default that all parameters included in the air interface security-related information are security parameters of the 5G system. It should be noted that the air interface control plane encryption algorithm may be the same as or different from the air interface user plane encryption algorithm. If the encryption algorithms are the same, an air interface encryption algorithm may be used for indication. If the encryption algorithms are different, the air interface control plane encryption algorithm and the air interface user plane encryption algorithm are separately used for indication. Similarly, if integrity protection may also be performed on an air interface user plane, the air interface control plane integrity protection algorithm may be the same as or different from the air interface user plane integrity protection algorithm. If the integrity protection algorithms are the same, an air interface integrity protection algorithm may be used for indication. If the integrity protection algorithms are different, the air interface control plane integrity protection algorithm and the air interface user plane integrity protection algorithm are separately used for indication. In addition, the air interface user plane integrity protection function may be optional, and whether integrity protection is performed on the air interface user plane is indicated by using the indication information indicating whether the air interface user plane integrity protection function is enabled. The terminal device receives the security mode command message by the NR PDCP, obtains the information that is carried in the security mode command message and that is required for activating air interface security, and configures air interface security. For example, the terminal device derives a key according to the security mechanism of the 5G system, and configures the derived key and an algorithm for the NR PDCP. (Optionally, in this case, it is considered that air interface security has been activated). Optionally, if the information used to indicate that the terminal device is to access the 5GC includes the indication indicating whether the air interface user plane integrity protection function is enabled, after the terminal device establishes an NR PDCP of a DRB, the terminal device configures the information for the NR PDCP to indicate that integrity protection is enabled or is not enabled. Optionally, after obtaining a key and an algorithm for air interface control plane integrity protection and receiving the security mode command message, the terminal device requests to perform integrity protection check on the message by the NR PDCP. Optionally, unless otherwise specified, subsequent control plane messages received and sent by the terminal device are all encrypted and/or integrity-protected. Optionally, subsequent user plane data received and sent by the terminal device is encrypted and/or integrity-protected.

Optionally, the terminal device sends a security mode complete message to the network device. The message is sent after being processed by the NR PDCP of the SRB 1. Optionally, the message is integrity-protected and/or encrypted by the NR PDCP. An algorithm used for integrity protection/encryption is an algorithm specified in the security mode command message. Optionally, the algorithm used for integrity protection/encryption is an air interface control plane integrity protection algorithm/encryption algorithm corresponding to the security mechanism of the 5G system.

Optionally, after receiving the security mode command and activating air interface security, the terminal device sends an RRC connection reconfiguration complete message to the network device. The message is sent after being processed by the NR PDCP of the SRB 1. Optionally, the message is integrity-protected and/or encrypted by the NR PDCP. An algorithm used for integrity protection/encryption is an algorithm specified in the security mode command message. Optionally, the algorithm used for integrity protection/encryption is an air interface control plane integrity protection algorithm/encryption algorithm corresponding to the security mechanism of the 5G system.

It should be noted that this step and the foregoing step of sending the first RRC connection reconfiguration complete message to the network device after the PDCP is configured based on the reconfiguration information of the first signaling radio bearer are two parallel steps. If the terminal device does not send the first RRC connection reconfiguration complete message to the network device after configuring the PDCP based on the reconfiguration information of the first signaling radio bearer, the terminal device may send the RRC connection reconfiguration complete message to the network device in this step. In addition, a sequence of sending the RRC connection reconfiguration complete message to the network device and sending the security mode complete message by the UE to the network device in this step is not limited in this application.

Optionally, after air interface security is activated, the network device sends an RRC connection reconfiguration message to the terminal device, to configure/reconfigure a radio bearer. For example, the configured radio bearer includes an SRB 2 and/or a DRB. Herein, there may be one or more DRBs. Optionally, the RRC connection reconfiguration message carries radio resource configuration information of the configured radio bearer, and the radio resource configuration information may specifically include any one or more of the following information: identifier information of the radio bearer, indication information of the NR PDCP, the configuration information of the NR PDCP, the configuration information of RLC, the configuration information of MAC, and the configuration information of the LC. The identifier information (for example, an identifier of the SRB 2, and/or an identifier or identifiers of one or more DRBs) of the radio bearer corresponds to the configured radio bearer. The indication information of the NR PDCP is used to indicate that the terminal device is instructed to use the NR PDCP for the configured radio bearer. Optionally, the configuration information of the NR PDCP may include one or a combination of the following information: the identifier information of the radio bearer, an SN number length, an indication indicating whether an on-demand delivery function is activated, an indication indicating whether a reordering function is activated, an indication indicating whether a duplicate packet detection function is activated, an indication indicating whether a duplication (duplication) function is activated, a reordering window value (for example. Window_Size), a timer (for example, t-Reordering) used for reordering, and a timer (discard Timer) used for discarding. Optionally, the configuration information of the NR PDCP may be specified as an explicit value or a default value. The default value may be specified in a protocol, and does not need to be carried in an air interface message. Optionally, the configuration information of the NR PDCP is defined in an LTE protocol (for example, 36.331). Alternatively, optionally, the configuration information of the NR PDCP is carried in the RRC connection reconfiguration message in a form of a container (container). Optionally, the configuration information of the NR PDCP is defined in an NR protocol (for example, 38.331). The configuration information of RLC may include one or a combination of the following configuration information: an indication indicating whether a new RLC entity is established (establish), an indication indicating whether an RLC entity is reestablished (reestablish), an indication indicating whether an RLC entity is kept in a current state, an SN number length, uplink t-Poll retransmit, an uplink poll PDU, an uplink poll byte, an uplink maximum reselection threshold (for example, maxRetx Threshold), downlink reordering timer (for example, t-Reordering), and a downlink status report timer (for example, t-Status Prohibit). The configuration information of MAC may include any one or a combination of the following configuration information: an indication indicating whether MAC is reset (reset) and main MAC configuration (for content, refer to a MAC-Main Config information element in 36.331). The configuration information of the LC may include any one or a combination of the following configuration information: identifier information of the LC, an uplink sending priority, an uplink prioritized bit rate (for example, a prioritized bit rate), an uplink token bucket size (for example, bucket size duration), and a logical channel group identifier. Optionally, the RRC connection reconfiguration message is sent after being processed by the NR PDCP of the SRB 1. Optionally, the message is integrity-protected and encrypted by the NR PDCP. Algorithms used for integrity protection and encryption are algorithms specified in the security mode command message. Optionally, the algorithms used for integrity protection and encryption are an air interface control plane integrity protection algorithm and an air interface control plane encryption algorithm that correspond to the security mechanism of the 5G system.

Optionally, the terminal device receives the RRC connection reconfiguration message on the SRB 1 by the NR PDCP, and applies the radio resource configuration information in the message. After configuration is completed, the terminal device sends an RRC connection reconfiguration complete message to the network device on the SRB 1. Optionally, the message is integrity-protected and encrypted by the NR PDCP. Algorithms used for integrity protection and encryption are algorithms specified in the security mode command message. Optionally, the algorithms used for integrity protection and encryption are an air interface control plane integrity protection algorithm and an air interface control plane encryption algorithm that correspond to the security mechanism of the 5G system.

Optionally, the RRC connection reconfiguration message further includes at least one or a combination of the following information: bearer configuration information of a second signaling radio bearer, bearer configuration information of a data radio bearer, and the first security configuration information.

Optionally, the method 300 further includes: before the RRC connection reconfiguration message is received, receiving a security mode command message, where the security mode command message includes at least one or a combination of the following information: the first security configuration information and second security configuration information, where the second PDCP is used for the security mode command message, and the second security configuration information is used to activate air interface security according to a security mechanism corresponding to the second core network.

Specifically, the network device sends the security mode command message to the terminal device, where the message carries the information required for activating air interface security, and the message is sent by using the SRB 1. It should be noted that when the RRC connection setup complete message carries information used to indicate that the type of the CN to be accessed by the UE is the 5GC, the base station needs to configure, for the UE, information required for activating the air interface security mechanism corresponding to the 5G system. In addition, because the SRB 1 of the UE uses the LTE PDCP, and the security mode command needs to be integrity-protected, an integrity protection algorithm corresponding to an LTE system should be used. To perform integrity check on the message, the UE needs to learn of the integrity protection algorithm used for the message.

For example, the information that is included in the security mode command message and that is required for activating air interface security includes any one or more of the following information: a 5G security mechanism indication, an air interface encryption algorithm, an air interface integrity protection algorithm, an air interface control plane encryption algorithm, an air interface user plane encryption algorithm, an air interface control plane integrity protection algorithm, an air interface user plane integrity protection algorithm, an indication indicating whether an air interface user plane integrity protection function is enabled, an LTE air interface control plane integrity protection algorithm, and an LTE air interface control plane encryption algorithm. The 5G security mechanism indication is used to indicate that other information included in the information required for activating air interface security is a security parameter of the 5G system. For example, a security configuration that corresponds to the 5G system and that is included in the information required for activating air interface security is presented in a form of an extended information element, a security configuration corresponding to the LTE system is indicated in an original information element format, and the UE that is to access the 5GC reads an information element in the original format to obtain the algorithm used to perform integrity check on the message, and reads the extended information element to obtain information about the security configuration that corresponds to the 5G system and that is required for activating air interface security. Alternatively, whether a parameter included in the air interface security-related information is a security parameter of the 5G system needs to be specified. Alternatively, the UE considers by default that all parameters included in the air interface security-related information are security parameters of the 5G system. It should be noted that the air interface control plane encryption algorithm may be the same as or different from the air interface user plane encryption algorithm. If the encryption algorithms are the same, an air interface encryption algorithm may be used for indication. If the encryption algorithms are different, the air interface control plane encryption algorithm and the air interface user plane encryption algorithm are separately used for indication. Similarly, if integrity protection may also be performed on an air interface user plane, the air interface control plane integrity protection algorithm may be the same as or different from the air interface user plane integrity protection algorithm. If the integrity protection algorithms are the same, an air interface integrity protection algorithm may be used for indication. If the integrity protection algorithms are different, the air interface control plane integrity protection algorithm and the air interface user plane integrity protection algorithm are separately used for indication. In addition, the air interface user plane integrity function may be optional, and whether integrity protection is performed on the air interface user plane is indicated by using the indication information indicating whether the air interface user plane integrity protection function is enabled.

The terminal device receives the security mode command message by the LTE PDCP, obtains the information that is carried in the security mode command message and that is required for activating air interface security, and configures air interface security. For example, the UE derives a key according to the security mechanism of the 5G system, and configures the derived key and an algorithm for the NR PDCP after a radio bearer the NR PDCP is subsequently configured. (Optionally, in this case, it is considered that air interface security has been activated). Optionally, if the information used to indicate that the UE is to access the 5GC includes the indication indicating whether the air interface user plane integrity protection function is enabled, after the UE establishes an NR PDCP of a DRB, the UE configures the information for the NR PDCP to indicate that integrity protection is enabled or is not enabled. Optionally, after obtaining an air interface control plane integrity protection key and/or algorithm used for the security mode command, the UE requests to perform integrity protection check on the message by the LTE PDCP. Optionally, unless otherwise specified, subsequent control plane messages received and sent by the UE are all encrypted and/or integrity-protected. Optionally, subsequent user plane data received and sent by the UE is encrypted and/or integrity-protected.

Optionally, the first message is a radio resource control RRC connection setup complete message, and the first message is transmitted via the first signaling radio bearer after being processed by the second PDCP.

The following describes an access process during RRC connection reestablishment (reestablish). In addition, an RRC connection setup request message and an RRC connection resume (resume) request message may also carry information used to indicate that the UE is to access the 5GC. Therefore, processes are similar to the RRC reestablishment process in this embodiment. Specifically, this embodiment mainly uses RRC connection reestablishment (reestablish) as an example to describe the access process.

Optionally, the first message is one of the radio resource control RRC connection reestablishment request message, the RRC connection setup request message, or the RRC connection resume (resume) request message. The first indication information is used to indicate that the terminal device is to access the 5GC, and is specifically any one or more of the following information: a cell identifier and a terminal device identifier. For example, the cell identifier may be a cell identifier of an original cell (for example, a cell accessed last time) accessed by the terminal device, and may be specifically a physical cell identifier PCI, a global cell identifier ECGI, or a cell identifier/base station identifier used to identify a cell/based station in an access network paging area (for example, NG-RAN Area, RNA for short). The terminal device identifier may be a terminal identifier allocated to the UE in the original cell, and may be specifically a C-RNTI, a resume ID, an S-TMSI, an identifier that can be used to identify the UE in the base station, or an identifier that can be used to identify the UE in the access network paging area. The second message is a third RRC connection reconfiguration message, and the second message may be used to configure a second signaling radio bearer and/or a data bearer.

Optionally, after the first message is sent to the network device, a response message sent by the network device is received. When the first message is the RRC connection reestablishment request message, the response message is an RRC connection reestablishment message. When the first message is the RRC connection setup request message, the response message is an RRC connection setup message. When the first message is the RRC connection resume request message, the response message is an RRC connection resume message. The response message carries the second bearer configuration information of the first signaling radio bearer, and is used to instruct to configure a packet data convergence protocol of the first signaling radio bearer as the first packet data convergence protocol. Optionally, the terminal device performs security processing on the first message in an encryption manner and/or an integrity protection manner for an air interface in the 5G system, so that the base station checks the terminal device.

Specifically, the base station receives the first message sent by the UE, and learns, based on the cell identifier and/or UE identifier information carried in the first message, that the UE is UE that is to access the 5GC. The base station sends an RRC response message to the UE, and the RRC response message carries the configuration information of the NR PDCP of the SRB 1, so that the UE applies the NR PDCP to the SRB 1. Optionally, the base station checks the first message, and sends the RRC response message to the UE after the check succeeds. Optionally, the base station adds, to the RRC connection reestablishment message/RRC connection resume message, information required for re-activating air interface security. It should be noted that because the UE is the UE that is to access the 5GC, the base station needs to configure, for the UE, information required for re-activating the air interface security mechanism corresponding to the 5G system.

Optionally, the response message includes any one or more of the following information: the second bearer configuration information of the first radio bearer and the first security configuration information. The first security configuration information includes any one or a combination of the following information: a next hop chaining count value, a 5G system air interface control plane encryption algorithm identifier, a 5G system air interface control plane integrity protection algorithm identifier, a 5G system air interface user plane encryption algorithm identifier, a 5G system air interface user plane integrity protection algorithm identifier, and an indication indicating whether 5G system air interface user plane integrity protection is activated. For example, one or a combination of the 5G system air interface control plane encryption algorithm identifier, the 5G system air interface control plane integrity protection algorithm identifier, the 5G system air interface user plane encryption algorithm identifier, the 5G system air interface user plane integrity protection algorithm identifier, and the indication indicating whether 5G system air interface user plane integrity protection is activated may not need to be carried in the first security configuration information, and the terminal device considers by default that an algorithm is the same as a previously used algorithm. It should be noted that the air interface of the 5G system may be an NR air interface and/or an LTE air interface (or referred to as an E-UTRA air interface) connected to the 5GC.

Optionally, the UE obtains the first security configuration information carried in the response message, updates an air interface control plane/user plane encryption key and/or an air interface control plane/user plane integrity protection key according to the security mechanism of the 5G system, and configures, for the NR PDCP, a key and/or an algorithm required for air interface control plane/user plane encryption and/or air interface control plane/user plane integrity protection.

Figure 5:
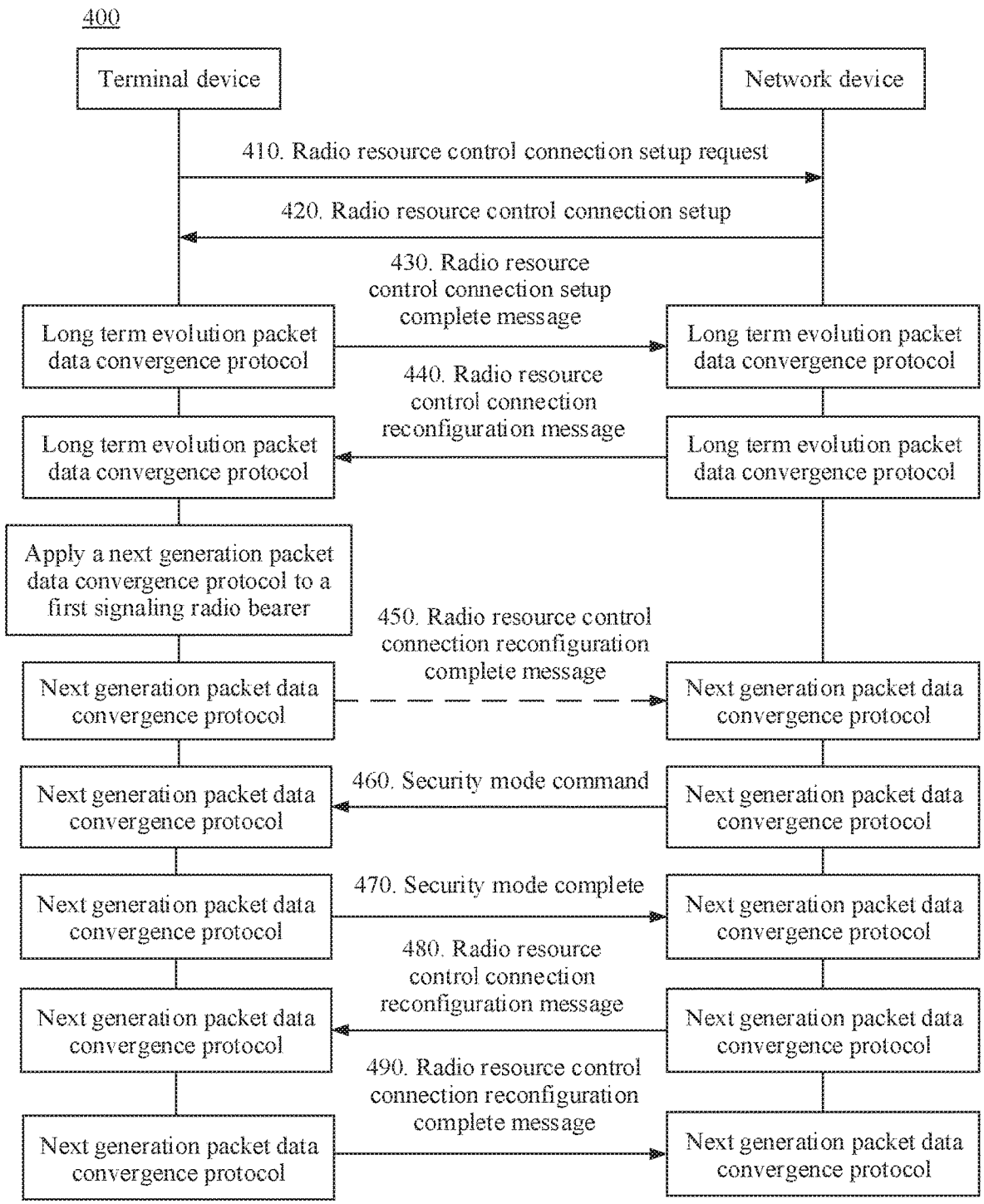
FIG. 5 is a schematic flowchart of a network access method according to this application.

FIG. 5 is a schematic flowchart of a network access method 400 according to this application. The method 400 may be applied to the scenario shown in FIG. 1, or certainly may be applied to another communication scenario. This is not limited in this embodiment of this application. As shown in FIG. 5, the method 400 includes the following content.

Step 410: A terminal device sends an RRC connection setup request message to a network device.

Step 420: The network device sends an RRC connection setup message to the terminal device, where the RRC connection setup message carries configuration information of an SRB 1, that is, an SRB ID of the SRB 1, configuration information of RLC, and configuration information of an LC. Optionally, the configuration information of RLC and the configuration information of the LC may be specified as explicit (explicit) values or default values.

Step 430: The terminal device uses an LTE PDCP for the SRB 1 by default, and sends an RRC connection setup complete message by using the SRB 1 based on the configuration of the SRB 1, where the message carries information used to indicate a type of a CN to be accessed by the terminal device. Optionally, the CN type may be an explicit indication, for example, an EPC or a 5GC. Alternatively, optionally, the CN type is an implicit indication, and is included in a terminal device ID (for example, 5G-S-TMSI indicates that the CN type is the 5GC), or is included in a core network node ID (for example, an AMF ID, an AMF group ID, an AMF pointer, and an AMF set ID in the message all indicate that the CN type is the 5GC).

The RRC connection setup complete message is the first message in the method 300.

Step 440: When the RRC connection setup complete message carries the information used to indicate that the terminal device is to access the 5GC, the network device sends an RRC connection reconfiguration message to the terminal device, where the RRC connection reconfiguration message carries second bearer configuration information of the SRB 1, and is used to instruct the terminal device to configure a PDCP of the SRB 1 as an NR PDCP. Optionally, the second bearer configuration information carries any one or more of the following information: identifier information of the radio bearer, indication information of the NR PDCP, configuration information of the NR PDCP, the configuration information of RLC, configuration information of MAC, and the configuration information of the LC. An identifier of the radio bearer corresponds to the SRB 1. The indication information of the NR PDCP is used to indicate that the terminal device is instructed to process an RRC message of the SRB 1 by the NR PDCP. Optionally, the configuration information of the NR PDCP may include one or a combination of the following information: the identifier information of the radio bearer, an SN number length, an indication indicating whether an on-demand delivery function is activated, an indication indicating whether a reordering function is activated, an indication indicating whether a duplicate packet detection function is activated, an indication indicating whether a duplication (duplication) function is activated, a reordering window value (for example, Window_Size), a timer (for example, t-Reordering) used for reordering, and a timer (discard Timer) used for discarding.

Optionally, all or some information included in the configuration information of the NR PDCP may be specified as explicit (explicit) configuration values or default (default) configuration values. The default values may be specified in a protocol, and do not need to be carried in an air interface message. The identifier of the radio bearer corresponds to the SRB 1. Optionally, the configuration information of the NR PDCP is defined in an LTE protocol (for example, 36.331). Alternatively, optionally, the configuration information of the NR PDCP is included in the RRC connection reconfiguration message in a form of a container (container). Optionally, the configuration information of the NR PDCP is defined in an NR protocol (for example, 38.331). The configuration information of RLC may include one or a combination of the following configuration information of LTE RLC when the NR PDCP is used: an indication indicating whether an RLC entity is reestablished (reestablish), an indication indicating whether an RLC entity is kept in a current state, an SN number length, uplink t-Poll retransmit, an uplink poll PDU, an uplink poll byte, an uplink maximum reselection threshold (for example, maxRetx Threshold), downlink reordering timer (for example, t-Reordering), and a downlink status report timer (for example, t-Status Prohibit). The configuration information of MAC may include any one or a combination of the following configuration information of MAC when the NR PDCP is used: an indication indicating whether MAC is reset (reset) and main MAC configuration (for content, refer to a MAC-Main Config information element in 36.331). The configuration information of the LC may include any one or a combination of the following configuration information of the LC when the NR PDCP is used: identifier information of the LC, an uplink sending priority, an uplink prioritized bit rate (for example, a prioritized bit rate), an uplink token bucket size (for example, bucket size duration), and a logical channel group identifier. Optionally, the RRC connection reconfiguration message is not encrypted or integrity-protected.

After receiving the RRC connection reconfiguration message, the terminal device applies the configuration information in the RRC connection reconfiguration message. For example, the terminal device releases an LTE PDCP entity (entity) of the SRB 1, and establishes a new NR PDCP entity for the SRB 1. For example, if the RRC connection setup complete message includes the indication information of the NR PDCP and indicates that the NR PDCP is applied to the SRB 1 of the terminal device, the terminal device releases the LTE PDCP for the SRB 1, and establishes the NR PDCP. Optionally, a start SN number of the NR PDCP is set to 0. Alternatively, optionally, the terminal device stores the first SN number that is not used before the LTE PDCP is released, and after the terminal device establishes the NR PDCP for the SRB 1, a start SN number of the NR PDCP is set to the stored first SN number that is not used before the LTE PDCP is released. For example, if the indication information that is included in the configuration information of RLC and that indicates whether the RLC entity is reestablished (reestablish) instructs the terminal device to reestablish the RLC entity for the SRB 1, RLC reestablishment is performed according to an RLC protocol specification. For example, if the indication information that is included in the configuration information of RLC and that indicates whether the RLC entity is kept in a current state instructs the terminal device to keep the RLC entity for the SRB 1, the terminal device does not interrupt current RLC work, does not discard a packet in an RLC buffer, but continues transmission and retransmission according to an RLC protocol specification. Optionally, unless otherwise specified, when the terminal device sends a subsequent RRC message and receives a subsequent RRC message by using the SRB 1, the NR PDCP is used for processing.

Optionally, the terminal device sends an RRC connection reconfiguration complete message to the network device. The RRC message is transmitted via the SRB 1 after being processed by the LTE PDCP, and the message is not encrypted or integrity-protected.

Step 450: Optionally, if the terminal device sends the RRC connection reconfiguration complete message to the network device in the foregoing step, the terminal device sends the RRC connection reconfiguration complete message to the network device. The message is transmitted via the SRB 1 after being processed by the NR PDCP. Optionally, the RRC connection reconfiguration complete message is not encrypted or integrity-protected. Optionally, an SN number of the message is the start SN number of the NR PDCP.

Step 460: The network device sends a security mode command message to the terminal device, where the message is transmitted via the SRB 1. Optionally, the security mode command message includes first security configuration information, which carries information required for activating air interface security. It should be noted that, because the RRC connection setup complete message carries information used to indicate that the terminal device is to access the 5GC, in a possible manner, the network device needs to configure, for the terminal device, information required for activating an air interface security mechanism corresponding to a 5G system. For example, the first security configuration information may specifically include any one or more of the following information: a 5G security mechanism indication, an air interface encryption algorithm, an air interface integrity protection algorithm, an air interface control plane encryption algorithm, an air interface user plane encryption algorithm, an air interface control plane integrity protection algorithm, an air interface user plane integrity protection algorithm, and an indication indicating whether an air interface user plane integrity protection function is enabled. The 5G security mechanism indication is used to indicate that other information included in the information required for activating air interface security is a security parameter of the 5G system. For example, the information required for activating air interface security is an information element/information extended based on the original security mode command, and the terminal device that is to access the 5GC reads the information element/ information to obtain the information required for activating air interface security. Alternatively, whether a parameter included in the information required for activating air interface security is a security parameter of the 5G system needs to be specified. Alternatively, the terminal device considers by default that all parameters included in the air interface security-related information are security parameters of the 5G system. It should be noted that the air interface control plane encryption algorithm may be the same as or different from the air interface user plane encryption algorithm. If the encryption algorithms are the same, an air interface encryption algorithm may be used for indication. If the encryption algorithms are different, the air interface control plane encryption algorithm and the air interface user plane encryption algorithm are separately used for indication. Similarly, if integrity protection may also be performed on an air interface user plane, the air interface control plane integrity protection algorithm may be the same as or different from the air interface user plane integrity protection algorithm. If the integrity protection algorithms are the same, an air interface integrity protection algorithm may be used for indication. If the integrity protection algorithms are different, the air interface control plane integrity protection algorithm and the air interface user plane integrity protection algorithm are separately used for indication. In addition, the air interface user plane integrity function may be optional, and whether integrity protection is performed on the air interface user plane is indicated by using the indication information indicating whether the air interface user plane integrity protection function is enabled. The terminal device receives the security mode command message by the NR PDCP, obtains the information that is carried in the security mode command message and that is required for activating air interface security, and configures air interface security. Optionally, the terminal device derives a key according to a security mechanism of the 5G system. In a key derivation process, an algorithm specified in the first security configuration information may need to be used. Then, the terminal device configures the derived key and the algorithm for the NR PDCP. (Optionally, in this case, it is considered that air interface security has been activated). It should be noted that the algorithm (for example, any one or more of the following algorithms: an air interface encryption algorithm, an air interface integrity protection algorithm, an air interface control plane encryption algorithm, an air interface user plane encryption algorithm, an air interface control plane integrity protection algorithm, and an air interface user plane integrity protection algorithm) carried in the first security configuration information may be an algorithm defined for a 4G system, an algorithm defined for the 5G system, or an algorithm defined for NR. For example, the algorithm defined for the 4G system may include eia0-v920, eia1, eia2, eia3, eea0, eea1, eea2, or eea3. For example, the algorithm defined for NR may include nia0, 128-nia1, 128-nia2, 128-nia3, nea0, 128-nea1, 128-nea2, or 128-nea3. For example, for the algorithm defined for the 5G system, refer to an algorithm defined in a 5G system security mechanism protocol (for example, 3GPP TS33.501). Optionally, if the information used to indicate that the terminal device is to access the 5GC includes the indication indicating whether the air interface user plane integrity protection function is enabled, after the terminal device establishes an NR PDCP of a DRB, the terminal device configures the information for the NR PDCP to indicate that integrity protection is enabled or is not enabled. Optionally, after obtaining a key and an algorithm for air interface control plane integrity protection, the terminal device requests to perform integrity protection check on the security mode command message by the NR PDCP. Optionally, unless otherwise specified, subsequent control plane messages received and sent by the terminal device are all encrypted and/or integrity-protected. Optionally, subsequent user plane data received and sent by the terminal device is encrypted and/or integrity-protected.

The security mode command message is the second message in the method 300.

Step 470: The terminal device sends a security mode complete message to the network device, where the message is transmitted via the SRB 1 after being processed by the NR PDCP. Optionally, the message is integrity-protected and/or encrypted by the NR PDCP, and an algorithm used for integrity protection/encryption is an algorithm specified in the security mode command message. Optionally, the algorithm used for integrity protection/encryption is an air interface control plane integrity protection algorithm % encryption algorithm corresponding to the security mechanism of the 5G system.

Optionally, if the terminal device does not send the RRC connection reconfiguration complete message to the network device in the foregoing step, after receiving the security mode command and activating air interface security, the terminal device sends the RRC connection reconfiguration complete message to the network device. The message is transmitted via the SRB 1 after being processed by the NR PDCP. Optionally, the message is integrity-protected and/or encrypted by the NR PDCP. An algorithm used for integrity protection/encryption is an algorithm specified in the security mode command message. Optionally, the algorithm used for integrity protection/encryption is an air interface control plane integrity protection algorithm/encryption algorithm corresponding to the security mechanism of the 5G system. It should be noted that this step is an optional step in parallel with step 450 and step 440 of sending the RRC connection reconfiguration complete message. If the terminal device does not send the RRC connection reconfiguration complete message in step 440 and step 450, the terminal device may send the RRC connection reconfiguration complete message in this step. In addition, a sequence of the RRC connection reconfiguration complete message and a sequence of the security mode complete message in this step may be interchanged. This is not limited in this application.

Step 480: After air interface security is activated, the network device sends an RRC connection reconfiguration message to the terminal device, to configure/reconfigure a radio bearer. For example, the configured radio bearer includes an SRB 2 and/or a DRB. Herein, there may be one or more DRBs. In addition, it may be understood that the RRC connection reconfiguration message may be alternatively used to reconfigure the SRB 1. Optionally, the RRC connection reconfiguration message carries second bearer configuration information of the configured radio bearer. Specifically, the second bearer configuration information may include any one or more of the following information: identifier information of the radio bearer, the indication information of the NR PDCP, the configuration information of the NR PDCP, the configuration information of RLC, the configuration information of MAC, and the configuration information of the LC. The identifier information (for example, an identifier of the SRB 2/SRB 1/DRB) of the radio bearer corresponds to the configured radio bearer. The indication information of the NR PDCP is used to indicate that the terminal device is instructed to use the NR PDCP for the configured radio bearer. Optionally, the configuration information of the NR PDCP may include one or a combination of the following information: the identifier information of the radio bearer, an SN number length, an indication indicating whether an on-demand delivery function is activated, an indication indicating whether a reordering function is activated, an indication indicating whether a duplicate packet detection function is activated, an indication indicating whether a duplication (duplication) function is activated, a reordering window value (for example, Window_Size), a timer (for example, t-Reordering) used for reordering, and a timer (discard Timer) used for discarding. Optionally, the configuration information of the NR PDCP may be specified as an explicit value or a default value. The default value may be specified in a protocol, and does not need to be carried in an air interface message. Optionally, the configuration information of the NR PDCP is defined in an LTE protocol (for example, 36.331). Alternatively, optionally, the configuration information of the NR PDCP is carried in the RRC connection reconfiguration message in a form of a container (container). Optionally, the configuration information of the NR PDCP is defined in an NR protocol (for example, 38.331). The configuration information of RLC may include one or a combination of the following configuration information: an indication indicating whether a new RLC entity is established (establish), an indication indicating whether an RLC entity is reestablished (reestablish), an indication indicating whether an RLC entity is kept in a current state, an SN number length, uplink t-Poll retransmit, an uplink poll PDU, an uplink poll byte, an uplink maximum reselection threshold (for example, maxRetx Threshold), downlink reordering timer (for example, t-Reordering), and a downlink status report timer (for example, t-Status Prohibit). The configuration information of MAC may include any one or a combination of the following configuration information: an indication indicating whether MAC is reset (reset) and main MAC configuration (for content, refer to a MAC-Main Config information element in 36.331). The configuration information of the LC may include any one or a combination of the following configuration information: identifier information of the LC, an uplink sending priority, an uplink prioritized bit rate (for example, a prioritized bit rate), an uplink token bucket size (for example, bucket size duration), and a logical channel group identifier. Optionally, the RRC connection reconfiguration message is sent after being processed by the NR PDCP of the SRB 1. Optionally, the message is integrity-protected and encrypted by the NR PDCP. Algorithms used for integrity protection and encryption are algorithms specified in the security mode command message. Optionally, the algorithms used for integrity protection and encryption are an air interface control plane integrity protection algorithm and an air interface control plane encryption algorithm that correspond to the security mechanism of the 5G system.

Step 490: The terminal device receives the RRC connection reconfiguration message on the SRB 1 by the NR PDCP, and applies the second bearer configuration information in the message. After configuration is completed, the terminal device sends an RRC connection reconfiguration complete message to the network device on the SRB 1. Optionally, the terminal device sends the RRC connection reconfiguration complete message after applying the configuration information in the RRC connection reconfiguration message. Optionally, the message is integrity-protected and encrypted by the NR PDCP Algorithms used for integrity protection and encryption are algorithms specified in the security mode command message. Optionally, the algorithms used for integrity protection and encryption are an air interface control plane integrity protection algorithm and an air interface control plane encryption algorithm that correspond to the security mechanism of the 5G system.

In this embodiment of this application, before the security mode command message is sent, the terminal device sends the RRC connection setup complete message (the first message in the method 300) to indicate the type of the core network to be accessed by the terminal device. The network device instructs, based on the type of the core network to be accessed by the terminal device, the terminal device to configure the SRB 1 by the NR PDCP. In this embodiment of this application, the network device sends the security mode command message by the NR PDCP.

Figure 6:
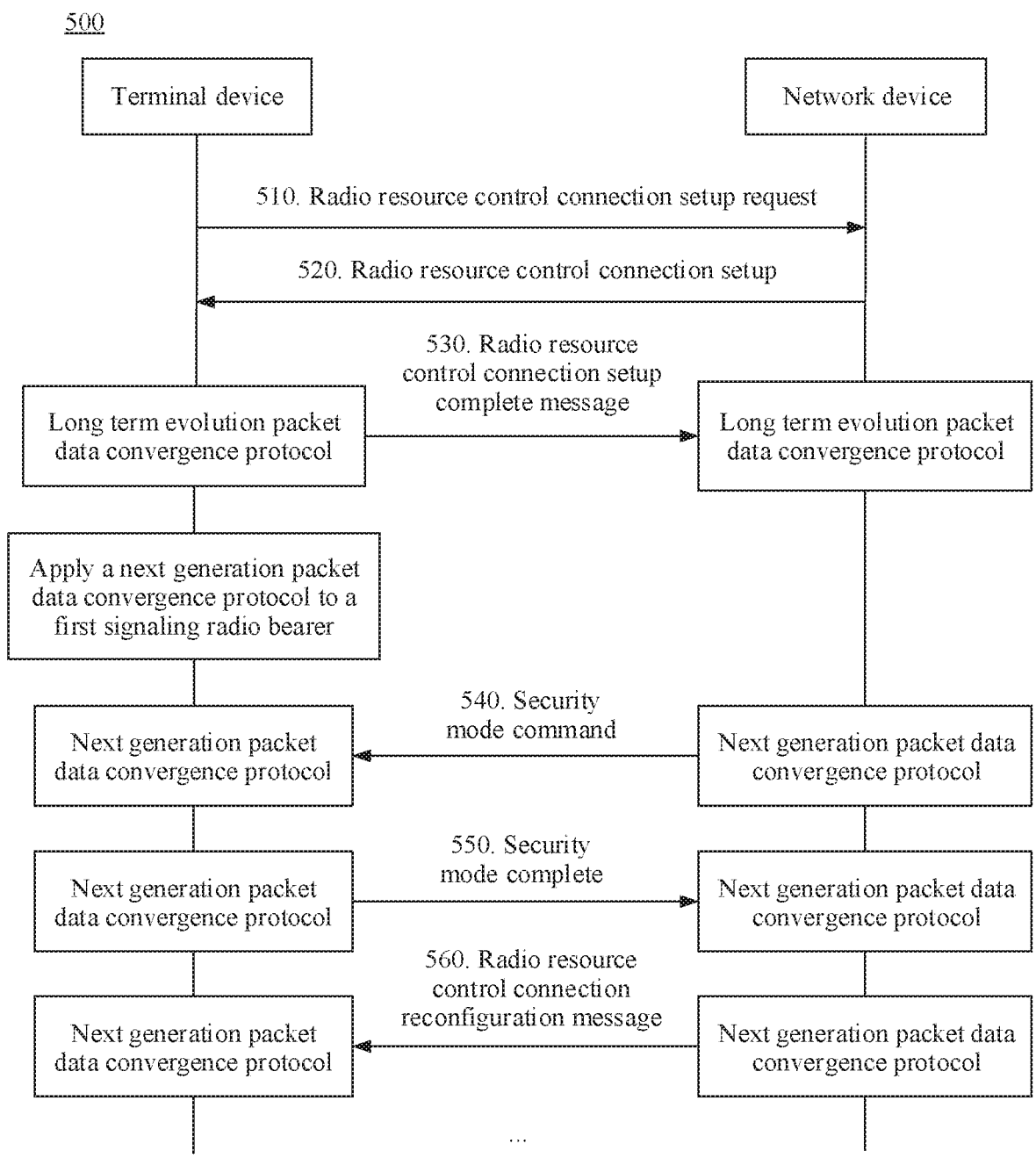
FIG. 6 is a schematic flowchart of a network access method according to this application.

FIG. 6 is a schematic flowchart of a network access method 500 according to this application. The method 500 may be applied to the scenario shown in FIG. 1, or certainly may be applied to another communication scenario. This is not limited in this embodiment of this application. As shown in FIG. 6, the method 500 includes the following content.

Step 510: A terminal device sends an RRC connection setup request message to a network device.

Step 520: The network device sends an RRC connection setup message to the terminal device. Optionally, the RRC connection setup message carries configuration information of an SRB 1, that is, an SRB ID of the SRB 1, configuration information of RLC, and configuration information of an LC. Optionally, the configuration information of RLC and the configuration information of the LC may be specified as explicit (explicit) values or default values.

The terminal device uses an LTE PDCP for the SRB 1 by default, and applies the configuration of the SRB 1.

Step 530: The terminal device sends an RRC connection setup complete message by using the SRB 1, where the message carries information used to indicate a type of a CN to be accessed by the UE. Optionally, the CN type may be an explicit indication, for example, an EPC or a 5GC. Alternatively, optionally, the CN type is an implicit indication, and for example, is implicitly included in a UE ID (for example, 5G-S-TMSI indicates that the CN type is the 5GC), or is implicitly included in a core network node ID (for example, an AMF ID, an AMF group ID, an AMF pointer, and an AMF set ID in the message all indicate that the CN type is the 5GC).

The RRC connection setup complete message is the first message in the method 300.

After the terminal device sends the RRC connection setup complete message, when the message carries information used to indicate that the type of the CN to be accessed by the terminal device is the 5GC, the terminal device applies an NR PDCP for the SRB 1. For example, a specific action of applying the NR PDCP by the terminal device to the SRB 1 includes: releasing, by the terminal device, an LTE PDCP entity of the SRB 1, and establishing a new NR PDCP entity for the SRB 1.

A specific process in which the terminal device applies the NR PDCP to the SRB 1 to configure the SRB 1 may be obtaining second bearer configuration information of the SRB 1. Specifically, for content of the second bearer configuration information of the SRB 1 and a method for applying the configuration information by the terminal device, refer to corresponding steps in the method 300 and the method 400. To avoid repetition, details are not described herein again. It should be noted that a manner in which the terminal device obtains the second bearer configuration information of the SRB 1 is different from that in the method 400. To be specific, in the method 400, the network device configures the second bearer configuration information for the terminal device by using displayed air interface signaling. However, in a possible manner in this method, the terminal device automatically obtains the second bearer configuration information of the SRB 1. For example, a specific configuration value of the second bearer configuration information of the SRB 1 is defined in a related protocol (for example, 3GPP TS36.331 and/or 3GPP TS38.331), and the terminal device uses the specific configuration value as a default value.

It should be specially noted that behavior of applying the NR PDCP by the terminal device to the SRB 1 should be synchronized with that of the network device. In other words, both the terminal device and the network device use the NR PDCP as a PDCP for processing a message carried in the SRB 1. Otherwise, if a type and a configuration of a PDCP used by the network device for the SRB 1 are inconsistent with those of a PDCP used by the terminal device, a message sent by a peer party cannot be correctly parsed. In addition, the RRC connection setup complete message sent by the terminal device in step 530 may be retransmitted. For example, the network device requests the terminal device for retransmission if the network device fails to receive the message. Retransmission may occur at a MAC layer. For example, the network device feeds back a HARQ NACK. Alternatively, retransmission may occur at an RLC layer. For example, an RLC status report fed back by the network device indicates that the message is not correctly received. Therefore, in a feasible manner, the NR PDCP is applied to the SRB 1 only after the terminal device sends the RRC connection setup complete message and determines that the network device correctly receives the message. Optionally, if a HARQ ACK fed back by the network device and received by the terminal device and/or an RLC status report fed back by the network device and received by the terminal device indicate/indicates that the network device correctly receives an RLC PDU corresponding to the message, the terminal device determines that the network device correctly receives the message. Optionally, the terminal device may reestablish RLC of the SRB 1 and/or reset MAC. In another feasible manner, before applying the NR PDCP to the SRB 1, the terminal device does not need to wait to determine that the network device correctly receives the RRC connection setup complete message. In other words, the terminal device may immediately apply the NR PDCP to the SRB 1 after sending the RRC connection setup complete message. However, the terminal device needs to maintain a data packet in an RLC buffer and/or a MAC buffer of the SRB 1. In other words, the terminal device cannot reestablish RLC of the SRB 1 and/or reset the MAC, to prevent the network device from requesting retransmission.

Step 540: When the RRC connection setup complete message carries information used to indicate that the terminal device is to access the 5GC, the network device learns that the terminal device is a terminal device that is to access the 5GC, and the network device sends a security mode command message to the terminal device by the NR PDCP, where the message is sent by using the SRB 1. Optionally, the security mode command message includes first security configuration information. For content included in the first security configuration information and descriptions about how the terminal device performs air interface activation based on the first security configuration information, refer to the method 400 for understanding. To avoid repetition, details are not described herein again. Optionally, unless otherwise specified, subsequent control plane messages received and sent by the terminal device are all encrypted and/or integrity-protected. Optionally, subsequent user plane data received and sent by the terminal device is encrypted and/or integrity-protected.

Step 550: The terminal device sends a security mode complete message to the network device. The message is sent after being processed by the NR PDCP of the SRB 1. Optionally, the message is integrity-protected and/or encrypted by the NR PDCP, and an algorithm used for integrity protection/encryption is an algorithm specified in the security mode command message. Optionally, the algorithm used for integrity protection/encryption is an air interface control plane integrity protection algorithm/encryption algorithm corresponding to the security mechanism of the 5G system.

Step 560: After air interface security is activated, the network device sends an RRC connection reconfiguration message to the terminal device, to configure/reconfigure a radio bearer. For a manner in which the network device sends the RRC connection reconfiguration message to the terminal device, refer to corresponding descriptions in the method 300 and the method 400. To avoid repetition, details are not described herein again.

The terminal device receives the RRC connection reconfiguration message on the SRB 1 by the NR PDCP, and applies radio resource configuration information in the message. After configuration is completed, the terminal device sends an RRC connection reconfiguration complete message to the network device on the SRB 1. Optionally, the message is integrity-protected and encrypted by the NR PDCP. Algorithms used for integrity protection and encryption are algorithms specified in the security mode command message. Optionally, the algorithms used for integrity protection and encryption are an air interface control plane integrity protection algorithm and an air interface control plane encryption algorithm that correspond to the security mechanism of the 5G system. For a specific manner in which the terminal device sends the RRC connection reconfiguration complete message to the network device, refer to corresponding descriptions in the method 300 and the method 400. To avoid repetition, details are not described herein again.

In this embodiment of this application, after sending the RRC connection setup complete message (the first message in the method 300), the terminal device autonomously switches to the NR PDCP. In this embodiment of this application, the terminal device receives the security mode command message by the NR PDCP, and does not require displayed air interface configuration signaling.

Figure 7:
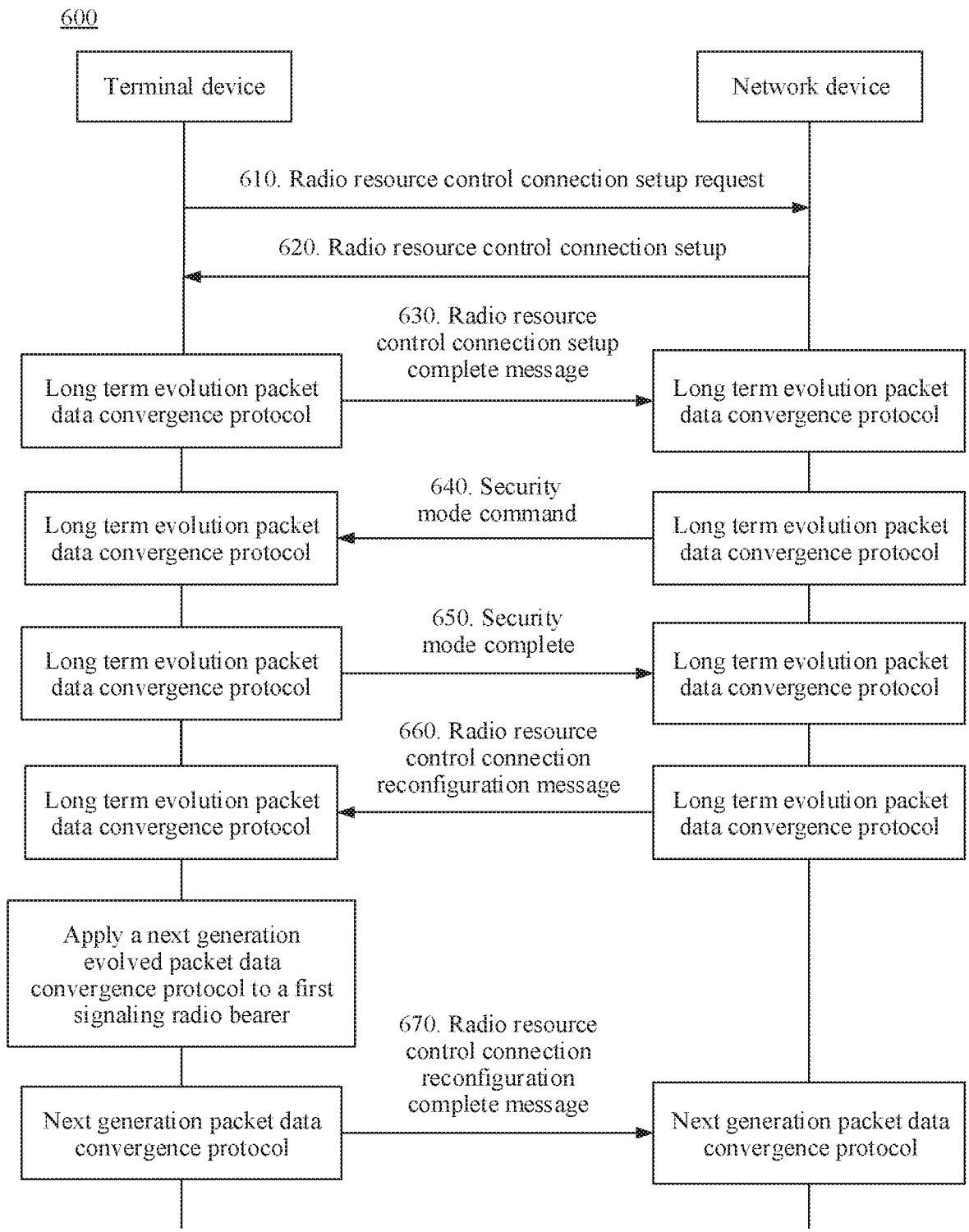
FIG. 7 is a schematic flowchart of a network access method according to this application.

FIG. 7 is a schematic flowchart of a network access method 600 according to this application. The method 600 may be applied to the scenario shown in FIG. 1, or certainly may be applied to another communication scenario. This is not limited in this embodiment of this application. As shown in FIG. 7, the method 600 includes the following content.

Step 610: A terminal device sends an RRC connection setup request message to a network device.

Step 620: The network device sends an RRC connection setup message to the terminal device. Optionally, the RRC connection setup message carries configuration information of an SRB 1, that is, an SRB ID of the SRB 1, configuration information of RLC, and configuration information of an LC. Optionally, the configuration information of RLC and the configuration information of the LC may be specified as explicit (explicit) values or default values.

The terminal device uses an LTE PDCP for the SRB 1 by default, and applies the configuration of the SRB 1.

Step 630: The terminal device sends an RRC connection setup complete message by using the SRB 1, where the message carries first indication information that is information used to indicate a type of a CN to be accessed by the terminal device. For descriptions of the CN type, refer to corresponding descriptions in the foregoing method. To avoid repetition, details are not described herein again.

The RRC connection setup complete message is the first message in the method 300.

Step 640: The network device sends a security mode command message to the terminal device, where the security mode command message carries second security configuration information, the second security configuration information includes information required for activating air interface security, and the message is transmitted via the SRB 1 after being processed by the LTE PDCP.

It should be noted that, because the RRC connection setup complete message carries information used to indicate that the terminal device is to access a 5GC, in a possible manner, the network device needs to configure, for the terminal device, information required for activating an air interface security mechanism corresponding to a 5G system. For example, the second security configuration information may specifically include any one or more of the following information: a 5G security mechanism indication, a first algorithm, a second algorithm, and a third algorithm. The first algorithm is used for key derivation, the second algorithm is an algorithm used for integrity protection and/or encryption when the LTE PDCP is used, and the third algorithm is an algorithm used for integrity protection and/or encryption when an NR PDCP is used. Two of the first algorithm, the second algorithm, and the third algorithm may be the same or different. This is not limited in this patent. Optionally, the first algorithm/second algorithm/third algorithm may include any one or more of the following several pieces of information: an air interface integrity protection algorithm, an air interface control plane encryption algorithm, an air interface user plane encryption algorithm, an air interface control plane integrity protection algorithm, an air interface user plane integrity protection algorithm, and an indication indicating whether an air interface user plane integrity protection function is enabled. The 5G security mechanism indication is used to indicate that other information included in the information required for activating air interface security is a security parameter of the 5G system. For example, the information required for activating air interface security is an information element/ information extended based on the original security mode command message, and the terminal device that is to access the 5GC reads the information element/information to obtain the information required for activating air interface security. Alternatively, whether a parameter included in the information required for activating air interface security is a security parameter of the 5G system needs to be specified. Alternatively, the terminal device considers by default that all parameters included in the air interface security-related information are security parameters of the 5G system. It should be noted that the air interface control plane encryption algorithm may be the same as or different from the air interface user plane encryption algorithm. If the encryption algorithms are the same, an air interface encryption algorithm may be used for indication. If the encryption algorithms are different, the air interface control plane encryption algorithm and the air interface user plane encryption algorithm are separately used for indication. Similarly, if integrity protection may also be performed on an air interface user plane, the air interface control plane integrity protection algorithm may be the same as or different from the air interface user plane integrity protection algorithm. If the integrity protection algorithms are the same, an air interface integrity protection algorithm may be used for indication. If the integrity protection algorithms are different, the air interface control plane integrity protection algorithm and the air interface user plane integrity protection algorithm are separately used for indication. In addition, the air interface user plane integrity function may be optional, and whether integrity protection is performed on the air interface user plane is indicated by using the indication information indicating whether the air interface user plane integrity protection function is enabled. The terminal device receives the security mode command message by the LTE PDCP, obtains the information that is carried in the security mode command message and that is required for activating air interface security, and configures air interface security. In an optional manner, the terminal device derives a key according to a security mechanism of the 5G system. In a key derivation process, an algorithm specified in the second security configuration information may need to be used. Then, the terminal device configures the derived key and the algorithm specified in the second security configuration information for the LTE PDCP. In another optional manner, the terminal device derives a key according to a security mechanism of a 4G system. In a key derivation process, an algorithm specified in the second security configuration information may need to be used. Then, the terminal device configures the derived key and the algorithm for the LTE PDCP. In another optional manner, the terminal device derives a key according to a security mechanism of a 4G system and the second algorithm, and then the terminal device configures the derived key and the algorithm for the LTE PDCP. In addition, the terminal device derives a key according to a security mechanism of the 5G system and the third algorithm, and then, when the terminal device uses the NR PDCP, the terminal device configures the key and the algorithm for the NR PDCP. (Optionally, in this case, it is considered that air interface security has been activated). It should be noted that the algorithm (for example, the first algorithm, the second algorithm, and the third algorithm) carried in the second security configuration information may be an algorithm defined for the 4G system, an algorithm defined for the 5G system, or an algorithm defined for NR. For example, the algorithm defined for the 4G system may include eia0-v920, eia1, eia2, eia3, eea0, eea1, eea2, or eea3. For example, the algorithm defined for NR may include nia0, 128-nia1, 128-nia2, 128-nia3, nea0, 128-nea1, 128-nea2, or 128-nea3. For example, for the algorithm defined for the 5G system, refer to an algorithm defined in a 5G system security mechanism protocol (for example, 3GPP TS33.501). Optionally, if the information used to indicate that the terminal device is to access the 5GC includes the indication indicating whether the air interface user plane integrity protection function is enabled, after the terminal device establishes an NR PDCP of a DRB, the terminal device configures the information for the NR PDCP to indicate that integrity protection is enabled or is not enabled. Optionally, after obtaining a key and an algorithm for air interface control plane integrity protection, the terminal device requests to perform integrity protection check on the security mode command message by the LTE PDCP. Optionally, unless otherwise specified, subsequent control plane messages received and sent by the terminal device are all encrypted and/or integrity-protected. Optionally, subsequent user plane data received and sent by the terminal device is encrypted and/or integrity-protected. In a possible example, the second security configuration information includes the algorithm defined for the 4G system and the algorithm defined for NR, and the terminal device derives a key based on the algorithm for the 4G system in a key derivation manner in the 5G system, and configures the derived key and the 4G algorithm for the LTE PDCP, to perform integrity protection check by the LTE PDCP. In another possible example, a method in which the security mode command message is sent by the LTE PDCP is as follows: The network device generates a PDCP SDU (that is, an RRC PDU of the security mode command message), processes the PDCP SDU by the NR PDCP to generate an integrity check field (in this case, an integrity protection algorithm defined for NR is used, and the algorithm needs to be indicated in the RRC PDU of the security mode command message), adds an SN number of the LTE PDCP after the PDCP SDU and the integrity check field are processed by the LTE PDCP, generates an LTE PDCP PDU, and sends the LTE PDCP PDU to the terminal device. Optionally, a processing process after the terminal device receives the security mode command message through an air interface is as follows: After the message is processed by the LTE PDCP, the integrity check field in the message is extracted, and integrity check is performed on the integrity check field by the NR PDCP. Information required for integrity check is obtained after an RRC layer interprets the RRC PDU of the security mode command message. It may be understood that the terminal device may send a security mode complete message in a same manner.

Step 650: The terminal device sends the security mode complete message to the network device, to indicate that air interface security is activated. The message is sent after being processed by the LTE PDCP of the SRB 1. Optionally, integrity protection is performed on the message by using an integrity protection algorithm the same as that used for the security mode command message. In a possible example, the algorithm used for integrity protection is an air interface control plane integrity protection algorithm defined in the 4G system.

Step 660: After air interface security is activated, the network device sends an RRC connection reconfiguration message to the terminal device, where the RRC connection reconfiguration message carries second bearer configuration information that is used to configure/reconfigure a radio bearer. For example, the configured radio bearer includes an SRB 2 and/or a DRB. Herein, there may be one or more DRBs. The reconfigured radio bearer includes the SRB 1. For example, the second bearer configuration information of the SRB 1 is used to instruct to apply the NR PDCP to the SRB 1. For content of the second bearer configuration information and descriptions of configuring the radio bearer by the terminal device based on the second bearer configuration information, refer to the method 400 and the method 500 for understanding. To avoid repetition, details are not described herein again. Optionally, the RRC connection reconfiguration message may further carry third security configuration information. The third security configuration information may specifically include any one or more of the following information: the 5G security mechanism indication, the first algorithm, and the third algorithm. Specific content and usage of each piece of information are consistent with those in the second security configuration information, and details are not described herein again. In an optional manner, the terminal device derives a key according to the first algorithm in a key derivation manner in the 5G security mechanism, and configures the derived key and the third algorithm for the NR PDCP for security processing on a subsequent message and/or subsequent data. In another optional manner, the terminal device does not change a previously derived key, and configures the previously derived key and the third algorithm for the NR PDCP for security processing on a subsequent message and/or subsequent data. In another feasible manner, the terminal device obtains air interface control plane security configuration information based on the second security configuration information received in step 640, and configures the air interface control plane security configuration information for the NR PDCP of the SRB 1 and/or the SRB 2, and the terminal device obtains air interface user plane security configuration information based on the third security configuration information received in this step, and configures the air interface user plane security configuration information for the NR PDCP of the DRB. In another feasible manner, the terminal device configures, for the NR PDCP, a key and an algorithm that are the same as those for the LTE PDCP.

Optionally, the terminal device sends an RRC connection reconfiguration complete message to the network device, and the message is transmitted via the SRB 1 after being processed by the LTE PDCP. Optionally, the message is integrity-protected and/or encrypted by the LTE PDCP.

Step 670: Optionally, the terminal device sends an RRC connection reconfiguration complete message to the network device by using the SRB 1, where the message is transmitted by the NR PDCP. Optionally, an SN number of the message is a start SN number of the NR PDCP. Optionally, the message is integrity-protected and encrypted by the NR PDCP. Algorithms used for integrity protection and encryption are algorithms specified in the second security configuration information or the third security configuration information. Optionally, the algorithm used for integrity protection/encryption is an air interface control plane integrity protection algorithm/encryption algorithm defined for NR.

Optionally, the second message is the 1st message that is sent by the network device to the terminal device and that uses an NR PDCP version.

In this embodiment of this application, before the security mode command message is sent, the terminal device sends the RRC connection setup complete message (the first message in the method 300) to indicate a type of a core network to be accessed by the terminal device. The terminal device receives, by the LTE PDCP, the security mode command message sent by the network device, and reconfigures the NR PDCP after air interface security is activated. The security mode command message includes an algorithm used for LTE PDCP integrity protection and/or encryption and/or an algorithm used for NR PDCP integrity protection and/or encryption.

Figure 8:
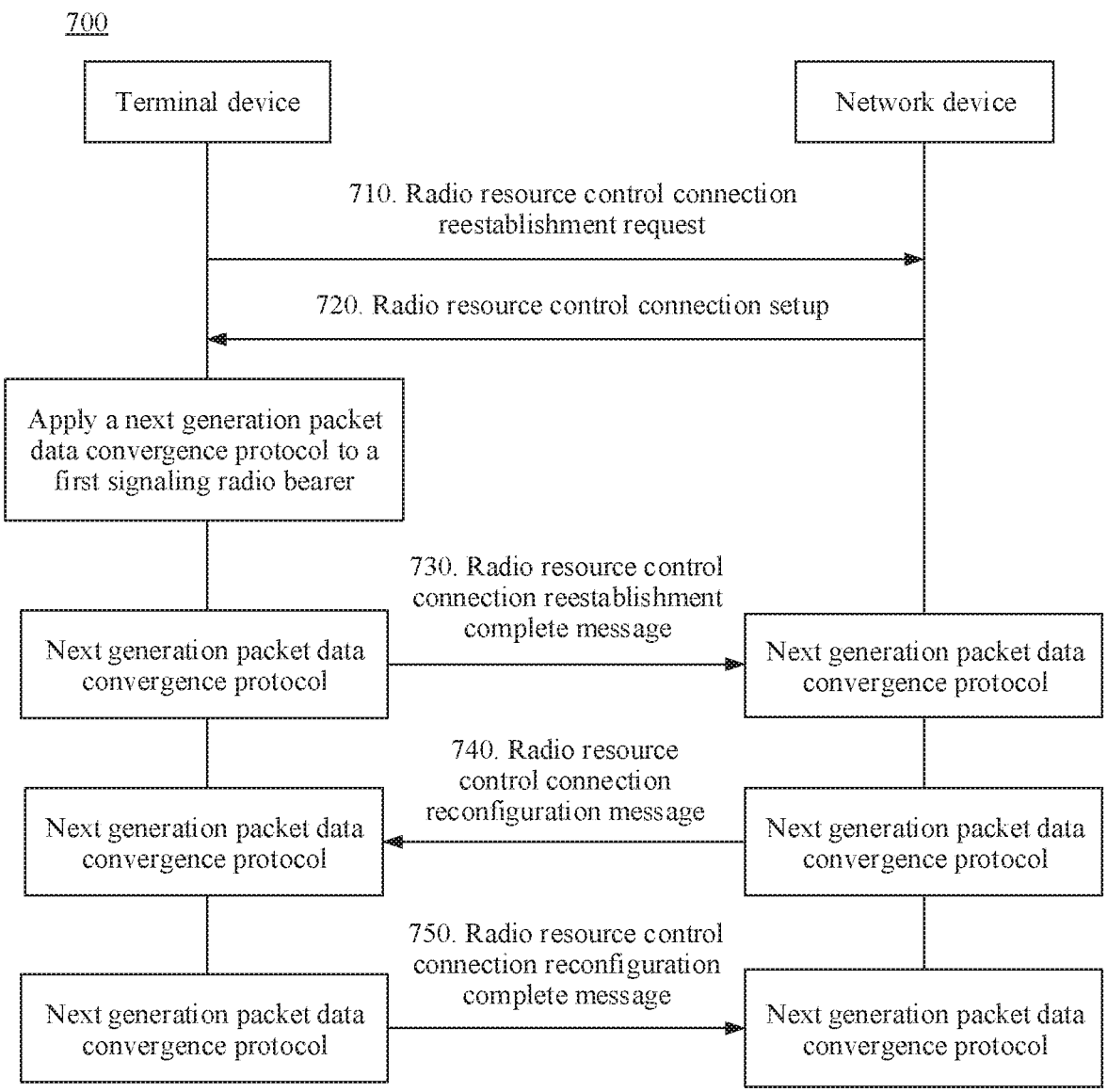
FIG. 8 is a schematic flowchart of a network access method according to this application.

FIG. 8 is a schematic flowchart of a network access method 700 according to this application. The method 700 may be applied to the scenario shown in FIG. 1, or certainly may be applied to another communication scenario. This is not limited in this embodiment of this application. As shown in FIG. 8, the method 700 includes the following content.

Step 710: A terminal device sends an RRC connection reestablishment request message to a network device, where the RRC connection reestablishment request message carries identifier information (for example, a physical cell identifier PCI) of an original cell (for example, a source primary cell during handover or a primary cell in which reestablishment is triggered) of the terminal device and UE identifier information (for example, a cell radio network temporary identifier C-RNTI or an S-TMSI) of the terminal device in the original cell.

Step 720: The network device receives the RRC connection reestablishment request message sent by the terminal device, and learns, based on the identifier information of the original cell of the terminal device and/or the UE identifier information of the terminal device in the original cell that are/is carried in the RRC connection reestablishment request message, that the terminal device is a terminal device that is to access a 5GC.

The network device sends an RRC connection reestablishment message to the terminal device, where the RRC connection reestablishment message carries second bearer configuration information of an SRB 1, to instruct the terminal device to apply an NR PDCP to the SRB 1. For specific content of the second bearer configuration information and a method for configuring the SRB 1 by the terminal device based on the second bearer configuration information of the SRB 1, refer to descriptions of the methods 300, 400, 500, and 600. Details are not described herein again. Optionally, the network device adds, to the RRC connection reestablishment message, information required for re-activating air interface security. It should be noted that because the terminal device is the terminal device that is to access the 5GC, the network device needs to configure, for the terminal device, information required for re-activating an air interface security mechanism corresponding to a 5G system.

Optionally, the information that is carried in the RRC connection reestablishment message and that is required for re-activating air interface security may include any one or more of the following information: a 5G security mechanism indication, a value of a parameter (for example, a parameter whose function is the same as or similar to that of a next hop chaining count in an LTE system) for updating a key, an air interface encryption algorithm, an air interface integrity protection algorithm, an air interface control plane encryption algorithm, an air interface user plane encryption algorithm, an air interface control plane integrity protection algorithm, an air interface user plane integrity protection algorithm, and an indication indicating whether an air interface user plane integrity protection function is enabled. For example, the parameter for updating a key may be a parameter whose function is the same as or similar to that of the next hop chaining count in the LTE system. It should be noted that, when the terminal device derives an air interface control plane and/or user plane encryption key, whether to use an original encryption key may be specified in a protocol or indicated by using the information that is carried in the RRC connection reestablishment message and that is required for re-activating air interface security. Similarly, when the terminal device derives an air interface control plane and/or user plane integrity protection key, whether to use an original integrity key may be specified in a protocol or indicated by using the information that is carried in the RRC connection reestablishment message and that is required for re-activating air interface security. Similarly, whether user plane integrity protection of the terminal device is enabled may also be specified in a protocol that specifies whether an original configuration is still used, or may be indicated by using the information that is carried in the RRC connection reestablishment message and that is required for re-activating air interface security.

Optionally, the terminal device obtains the information that is carried in the RRC connection reestablishment message and that is required for re-activating air interface security, and configures air interface security. For example, the terminal device updates a key (for example, KeNB whose function is the same as or similar to that in the LTE system) according to the security mechanism of the 5G system, and performs air interface control plane integrity protection and derives an air interface control plane encryption key and an air interface user plane encryption key based on an updated key. The terminal device configures air interface control plane and user plane keys and/or algorithms for the NR PDCP, to activate air interface encryption and/or integrity protection. Optionally, if information used to indicate that the terminal device is to access the 5GC includes an indication of enabling the air interface user plane integrity protection function, the terminal device derives an air interface user plane integrity protection key based on the updated key, and subsequently, after the terminal device establishes an NR PDCP of a DRB, the terminal device configures the foregoing information for the NR PDCP to indicate that integrity protection is enabled. Optionally, unless otherwise specified, when the terminal device sends a subsequent RRC message and receives a subsequent RRC message by using the SRB 1, encryption and integrity protection are performed.

Step 730: The terminal device sends an RRC connection reestablishment complete message to the network device.

The message is sent after being processed by the NR PDCP of the SRB 1. Optionally, the message is integrity-protected and/or encrypted by the NR PDCP. Optionally, an algorithm used for integrity protection/encryption is an air interface control plane integrity protection algorithm/encryption algorithm corresponding to the security mechanism of the 5G system. Optionally, an SN number of the message is a start SN number of the NR PDCP.

Step 740: The network device sends an RRC connection reconfiguration message to the terminal device, to configure/reconfigure a radio bearer. For the RRC connection reconfiguration message, refer to descriptions in the method 300 and the method 400. To avoid repetition, details are not described herein again.

Step 750: The terminal device receives the RRC connection reconfiguration message on the SRB 1 by the NR PDCP, and applies the second bearer configuration information in the message. After configuration is completed, the terminal device sends an RRC connection reconfiguration complete message to the network device on the SRB 1. Optionally, the message is integrity-protected and encrypted by the NR PDCP. Algorithms used for integrity protection and encryption are algorithms specified in the RRC connection reestablishment message, or algorithms used by the terminal before reestablishment. Optionally, the algorithms used for integrity protection and encryption are an air interface control plane integrity protection algorithm and an air interface control plane encryption algorithm that correspond to the security mechanism of the 5G system.

One of causes for triggering RRC connection reestablishment is a handover failure. With reference to a scenario corresponding to this patent, the following provides a coherent process of triggering RRC connection reestablishment due to the handover failure.

Usually, after handover of UE fails, configuration in a source cell (for ease of description, the configuration used by the UE in the source cell is referred to as source configuration below) needs to be restored, and an appropriate cell is selected to initiate RRC connection reestablishment. In a 5G network, an LTE eNB (for ease of description, the eNB is referred to as an ng-eNB below) may be connected to both an EPC and a 5GC, so that the UE can access the EPC and the 5GC in a cell provided by the ng-eNB. It should be noted that, similarly, when the UE is handed over to the cell provided by the ng-eNB, a type (which is referred to as a target CN type below for simplified description) of an accessed CN, namely, the EPC or the 5GC, also needs to be specified.

In a possible handover method, a source base station determines a target base station and the target CN type. When the target CN type is inconsistent with a source CN type, the source based station sends an inter-core network handover request message to a source core network, and the message carries identifier information of the target base station. The target base station receives a handover request message sent by a target core network, and obtains a context (for example, including a security context and a QoS context of the UE) of the UE. The target base station sends a handover request acknowledgment message to the source base station by using the target core network, and the handover request acknowledgment message carries handover command information sent by the target base station to the UE. The source base station receives an inter-core network handover request acknowledgment message sent by the source core network, and the inter-core network handover request acknowledgment message carries the handover command information sent by the target base station to the UE. The target base station sends a handover command message through an air interface, and the handover command message carries the handover command information sent by the target base station to the UE. The UE receives the handover command message sent by the source base station, learns of the target CN type by using the message, and applies configuration information carried in the handover command information sent by the target base station. The configuration information corresponds to the target CN type. For example, when the target CN type is the EPC, a security configuration is an algorithm and/or security information corresponding to LTE, and QoS configuration information is bearer information at an EPS-bearer granularity. When the target CN type is the 5GC, a security configuration may be an algorithm and/or security information corresponding to the 5G system.

Based on the foregoing handover method, if RRC connection reestablishment needs to be triggered due to the handover failure of the UE, after restoring to the source configuration, the UE selects a cell to initiate RRC connection reestablishment. If the UE initiates reestablishment in the source cell, when the source base station receives an RRC connection reestablishment request sent by the UE and performs check, because the reestablishment initiated by the UE is performed based on the source configuration, the check may succeed. If the UE initiates reestablishment in a target cell, when the target base station receives an RRC connection reestablishment request sent by the UE and performs check, because the target base station receives, in a handover preparation process, information corresponding to the target CN type and the context of the UE, but the source configuration of the UE is configuration information corresponding to the source CN type, the check performed by the target base station cannot succeed, and consequently, the reestablishment of the UE fails. For the foregoing case in which the reestablishment of the UE in the cell of the target base station fails, there is no feasible solution in the prior art to specify how the UE performs subsequent processing. For this problem, this embodiment provides two feasible solutions: Solution 1: After the reestablishment of the UE in the cell of the target base station fails, the UE enters an RRC idle mode and then performs processing according to a procedure in the idle mode. Solution 2: Before initiating reestablishment, the UE determines a type of a base station/cell. If the base station/cell is the source base station/cell, the UE initiates reestablishment by using the source configuration. If the base station/cell is the target base station/cell, the UE initiates reestablishment by using target configuration. After the reestablishment fails, the UE enters an RRC idle mode. An advantage of Solution 1 is that UE behavior is simple, and when reestablishment is initiated to a base station/cell, a process of determining whether the base station/cell is the target base station/cell does not need to be added. Correspondingly, an advantage of Solution 2 is that when the UE initiates reestablishment to a base station/cell, a process of determining whether the base station/cell is the target base station/cell is added, so as to increase a probability of successful reestablishment.

Figure 9:
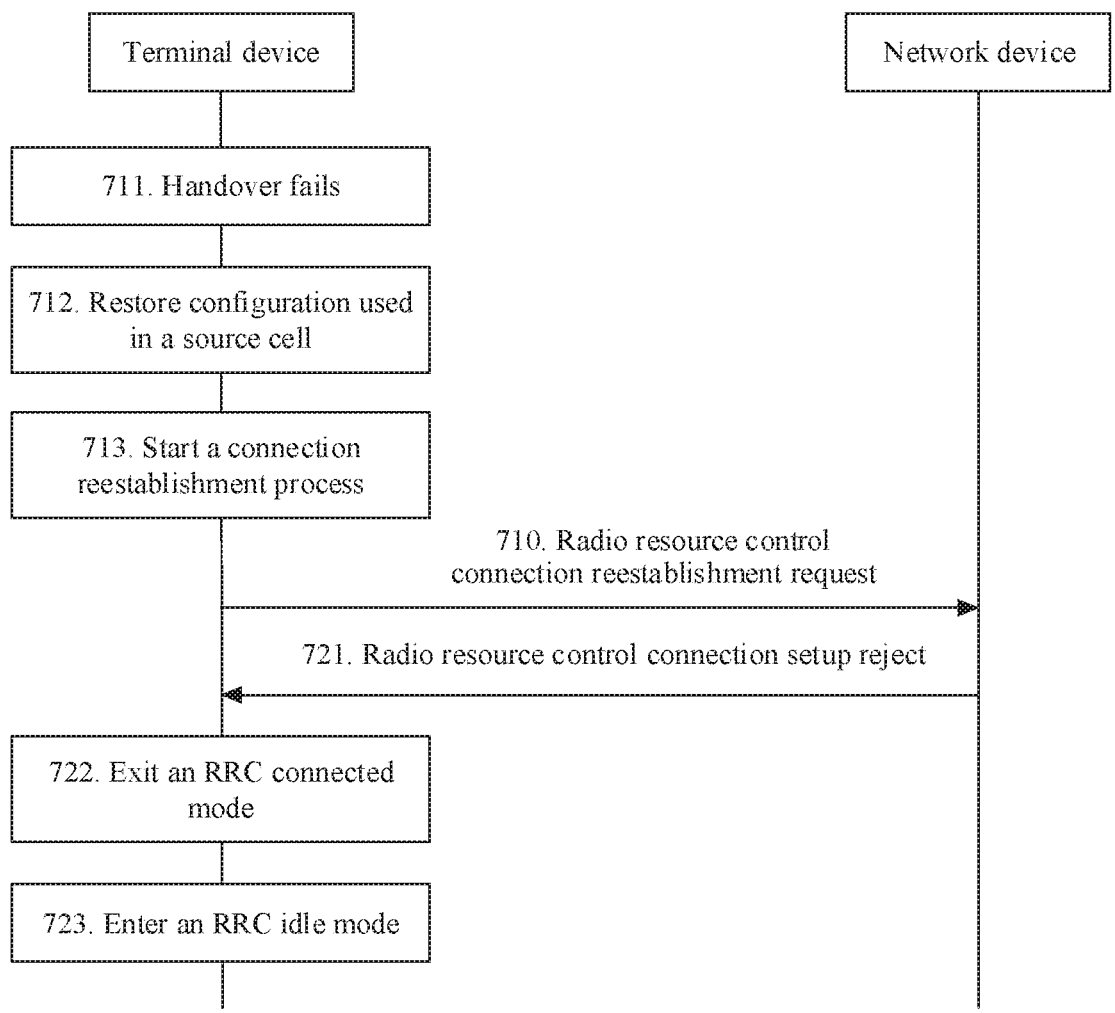
FIG. 9 is a schematic flowchart of a network access method according to this application.

Specific steps of a method 700A are provided below. FIG. 9 is a schematic flowchart of the network access method 700A according to this application.

Step 711: Handover of a terminal device fails, where both a source base station and a target base station in the handover are LTE eNBs. For example, a source core network of the UE is an EPC, and a target core network of the UE is a 5GC. Alternatively, both a source core network and a target core network of the UE are 5GCs. Alternatively, a source core network of the UE is a 5GC, and a target core network of the UE is an EPC. Optionally, the terminal device may determine, on a basis that a handover timer expires, that the handover fails, and the handover timer is a timer started after the terminal device starts handover. For example, the handover timer is T304 defined in an LTE system (for example, 3GPP TS36.331).

Step 712: The terminal device restores configuration information used in a source cell. Optionally, the configuration information includes security configuration information. For example, the security configuration information includes an air interface security key and a security algorithm.

Step 713: The terminal device starts an RRC connection reestablishment process, and the terminal device selects a cell used to initiate the RRC connection reestablishment process. For ease of description, the cell used to initiate the RRC connection reestablishment process is referred to as a target reestablishment cell. Optionally, the terminal device selects, according to an existing cell selection method (for example, a cell selection method defined in 3GPP TS36.304), the cell used to initiate the RRC connection reestablishment process.

Step 710: The terminal device sends an RRC connection reestablishment request message to a network device. Optionally, for a method for sending the message by the terminal device, refer to the prior art, or refer to the method described in the method 700. Details are not described herein again.

Step 721: The network device sends an RRC connection reestablishment reject message to the terminal device, to indicate that reestablishment of the terminal device fails.

Step 722: The terminal device exits an RRC connected mode. Optionally, the terminal device may exit the RRC connected mode by using a prior-art method (for example, a method defined in 3GPP TS36.331). Details are not described herein again.

Step 723: The terminal device enters an RRC idle mode. Optionally, the terminal device may enter the RRC idle mode by using a prior-art method (for example, a method defined in 3GPP TS36.331). Details are not described herein again.

Figure 10:
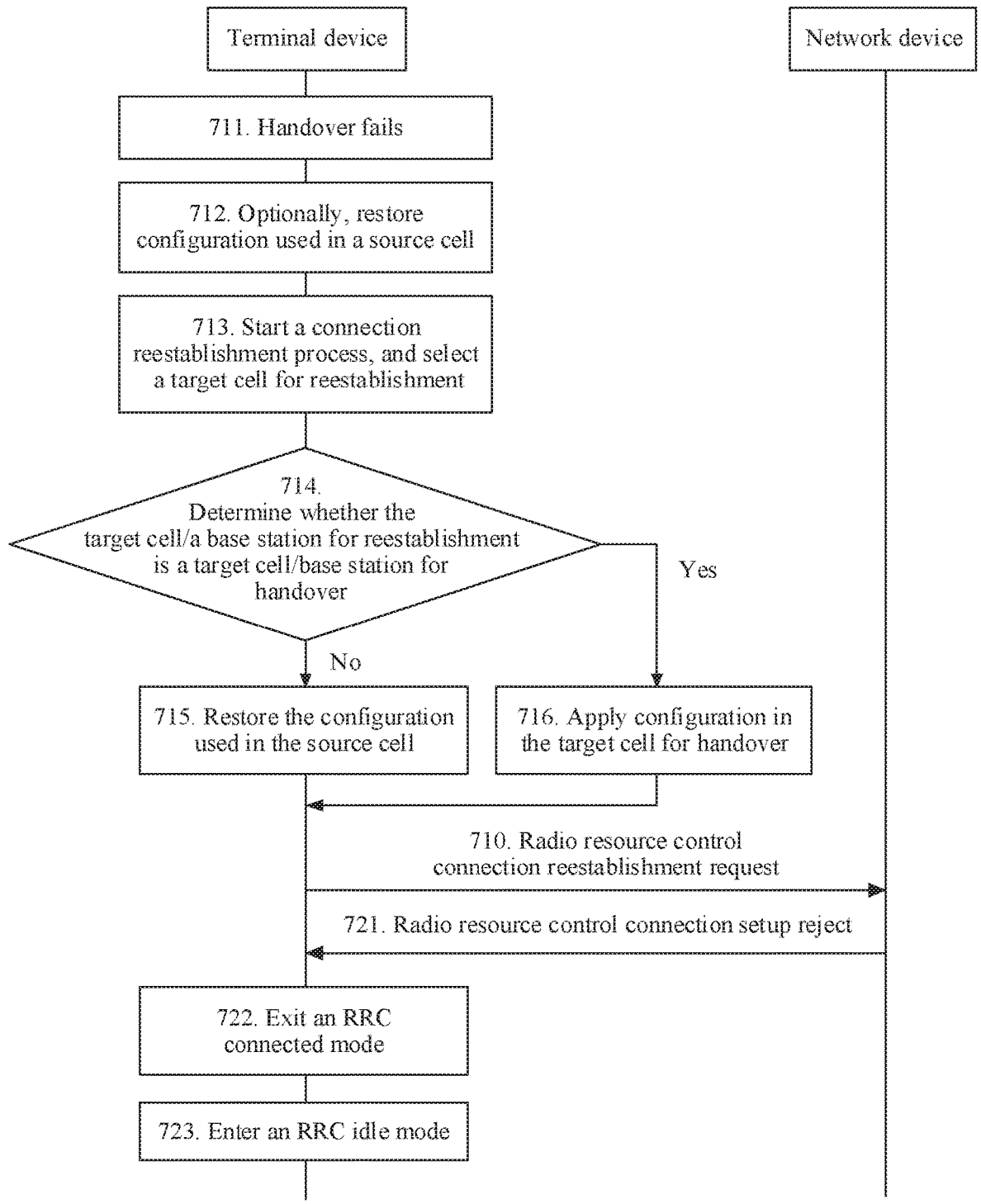
FIG. 10 is a schematic flowchart of a network access method according to this application.

Specific steps of a method 700B are provided below. FIG. 10 is a schematic flowchart of the network access method 700B according to this application.

Step 711: Handover of a terminal device fails, where both a source base station and a target base station in the handover are LTE eNBs. For example, a source core network of the UE is an EPC, and a target core network of the UE is a 5GC. Alternatively, a source core network of the UE is a 5GC, and a target core network of the UE is an EPC. Optionally, the terminal device may determine, on a basis that a handover timer expires, that the handover fails, and the handover timer is a timer started after the terminal device starts handover. For example, the handover timer is T304 defined in an LTE system (for example, 3GPP TS36.331).

Step 712: Optionally, the terminal device restores configuration information used in a source cell. Optionally, the configuration information includes security configuration information. For example, the security configuration information includes an air interface security key and a security algorithm.

Step 713: The terminal device starts an RRC connection reestablishment process, and the terminal device selects a cell used to initiate the RRC connection reestablishment process. For ease of description, the cell used to initiate the RRC connection reestablishment process is referred to as a target reestablishment cell. Optionally, the terminal device selects, according to an existing cell selection method (for example, a cell selection method defined in 3GPP TS36.304), the cell used to initiate the RRC connection reestablishment process.

Step 714: The terminal device determines whether a base station to which the target reestablishment cell belongs is a target base station. For example, the terminal device determines, through comparison, whether a cell identifier of the target reestablishment cell is consistent with a cell identifier of a target handover cell, or the terminal device determines, through comparison, whether a base station identifier of a target reestablishment base station is consistent with a base station identifier of a target handover base station.

Step 715: If the terminal device determines that the base station to which the target reestablishment cell belongs is not the target base station, the terminal device restores the configuration information used in the source cell.

Step 716: If the terminal device determines that the base station to which the target reestablishment cell belongs is the target base station, the terminal device uses configuration information in the target handover cell.

It should be noted that step 715 and step 716 are two branches of a determining result in step 714, and are not performed simultaneously.

Step 710: The terminal device sends an RRC connection reestablishment request message to a network device based on configuration of the terminal device. Optionally, for a method for sending the message by the terminal device, refer to the prior art, or refer to the method described in the method 700. Details are not described herein again.

Step 721: The network device sends an RRC connection reestablishment reject message to the terminal device, to indicate that reestablishment of the terminal device fails.

Step 722: The terminal device exits an RRC connected mode. Optionally, the terminal device may exit the RRC connected mode by using a prior-art method (for example, a method defined in 3GPP TS36.331). Details are not described herein again.

Step 723: The terminal device enters an RRC idle mode. Optionally, the terminal device may enter the RRC idle mode by using a prior-art method (for example, a method defined in 3GPP TS36.331). Details are not described herein again.

Figure 11:
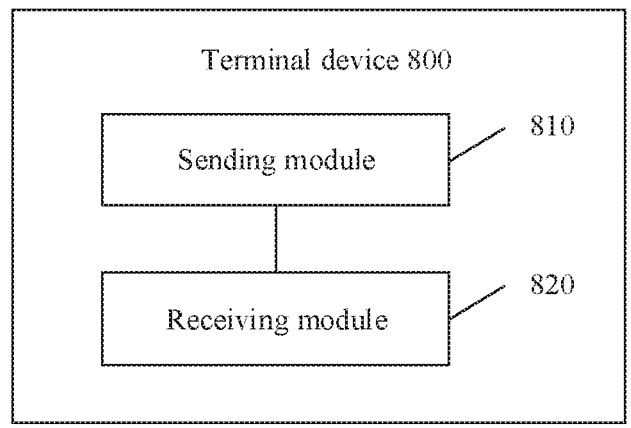
FIG. 11 is a schematic block diagram of a terminal device according to this application.

FIG. 11 is a schematic block diagram of a terminal device 800 according to this application. As shown in FIG. 11, the terminal device 800 includes: a sending module 810, configured to send a first message to a network device, where the first message includes first indication information, and the first indication information is used to indicate a type of a core network to be accessed by the terminal device; and a receiving module 820, configured to receive a second message sent by the network device, using a packet data covergence protocol for the second message, wherein version of the packet data convergence protocol is corresponding to the type of the core network.

When the first indication information is used to indicate that the type of the core network to be accessed by the terminal device is a first core network, using a first packet data convergence protocol PDCP for the second message: or when the first indication information is used to indicate that the type of the core network to be accessed by the terminal device is a second core network, using a second packet data convergence protocol PDCP for the second message.

Optionally, the first indication information is used to indicate that the type of the core network to be accessed by the terminal device is the first core network, and the terminal device further includes: an obtaining module, where the obtaining module is configured to obtain bearer configuration information of a first signaling radio bearer after the first message is sent to the network device, and the bearer configuration information of the first signaling radio bearer is used to instruct the terminal device to process, by the first PDCP, a message carried in the first signaling radio bearer.

The terminal device further includes a processing module, and the processing module is configured to configure the first signaling radio bearer based on the bearer configuration information of the first signaling radio bearer.

Optionally, the obtaining module is specifically configured to: before the second message is received, receive, by using the first signaling radio bearer, a radio resource control RRC connection reconfiguration message sent by the network device, where the RRC connection reconfiguration message includes the bearer configuration information of the first signaling radio bearer, and the second PDCP is used for the RRC connection reconfiguration message.

Optionally, the second message is a security mode command message, the second message includes first security configuration information, and the first security configuration information is used to activate air interface security according to a security mechanism corresponding to the first core network.

Optionally, the RRC connection reconfiguration message further includes at least one or a combination of the following information: bearer configuration information of a second signaling radio bearer, bearer configuration information of a data radio bearer, and the first security configuration information.

Optionally, the receiving module is further configured to: before the RRC connection reconfiguration message is received, receive a security mode command message, where the security mode command message includes at least one or a combination of the following information: first security configuration information and second security configuration information, where the second PDCP is used for the security mode command message, and the second security configuration information is used to activate air interface security according to a security mechanism corresponding to the second core network.

Optionally, the first message is a radio resource control RRC connection setup complete message, and the first message is transmitted via the first signaling radio bearer after being processed by the second PDCP.

Optionally, the first message is a message used to request to setup/reestablish/resume a radio resource control RRC connection, and the first message is transmitted via a third signaling radio bearer.

Optionally, the bearer configuration information includes any one or more of the following information: identifier information of the radio bearer, configuration information of the first PDCP, configuration information of a radio link control layer, configuration information of a media access control layer, and configuration information of a logical channel.

Optionally, when the first core network is a next generation core network 5GC, the first PDCP is a new radio NR packet data convergence protocol; and when the second core network is an evolved packet core EPC, the second packet data convergence protocol is an E-UTRA packet data convergence protocol.

It should be understood that the terminal device 800 completely corresponds to the terminal device in the method 300, the method 400, the method 500, the method 600, the method 700, the method 700A, and the method 700B, and may perform operations of the terminal device in the method 300, the method 400, the method 500, the method 600/the method 700, the method 700A, and the method 700B.

Figure 12:
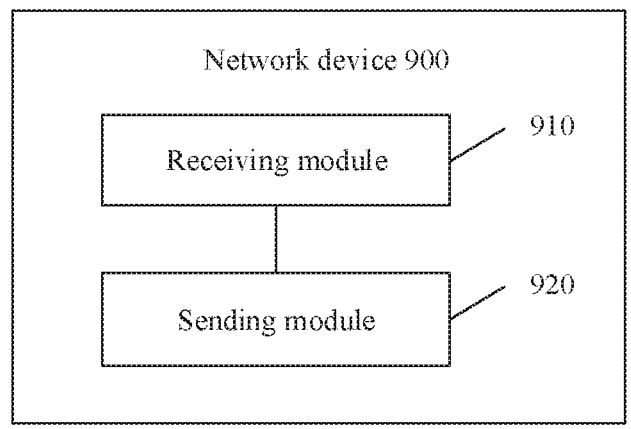
FIG. 12 is a schematic block diagram of a network device according to this application.

FIG. 12 is a schematic block diagram of a network device 900 according to this application. As shown in FIG. 12, the network device 900 includes:

a receiving module 910, configured to receive a first message sent by a terminal device, where the first message includes first indication information, and the first indication information is used to indicate a type of a core network to be accessed by the terminal device; and a sending module 920, configured to send a second message to the terminal device, where the second message is sent in a format of a packet data convergence protocol corresponding to the core network.

When the first indication information is used to indicate that the type of the core network to be accessed by the terminal device is a first core network, using a first packet data convergence protocol PDCP for the second message: or when the first indication information is used to indicate that the type of the core network to be accessed by the terminal device is a second core network, using a second packet data convergence protocol PDCP for using a second packet data convergence protocol PDCP for the second message.

Optionally, the first indication information is used to indicate that the type of the core network to be accessed by the terminal device is the first core network, and the sending module is further configured to: before the second message is sent, send a radio resource control RRC connection reconfiguration message to the terminal device by using a first signaling radio bearer, where the RRC connection reconfiguration message includes bearer configuration information of the first signaling radio bearer, the second PDCP is used for the RRC connection reconfiguration message, and the bearer configuration information of the first signaling radio bearer is used to instruct the terminal device to process, by the first PDCP, a message carried in the first signaling radio bearer.

Optionally, the second message is a security mode command message, the second message includes first security configuration information, and the first security configuration information is used to activate air interface security according to a security mechanism corresponding to the first core network.

Optionally, the RRC connection reconfiguration message further includes at least one or a combination of the following information: bearer configuration information of a second signaling radio bearer, bearer configuration information of a data radio bearer, and the first security configuration information.

Optionally, the sending module is further configured to: before the RRC connection reconfiguration message is sent, send a security mode command message to the terminal device, where the security mode command message includes at least one or a combination of the following information: first security configuration information and second security configuration information, where the second PDCP is used for the security mode command message, and the second security configuration information is used to activate air interface security according to a security mechanism corresponding to the second core network.

Optionally, the first message is a radio resource control RRC connection setup complete message, and the first message is transmitted via the first signaling radio bearer after being processed by the second PDCP.

Optionally, the first message is a message used to request to setup/reestablish/resume a radio resource control RRC connection, and the first message is transmitted via a third signaling radio bearer.

Optionally, the bearer configuration information includes any one or more of the following information: identifier information of the radio bearer, configuration information of the first PDCP, configuration information of a radio link control layer, configuration information of a media access control layer, and configuration information of a logical channel.

Optionally, when the first core network is a next generation core network 5GC, the first PDCP is a new radio NR packet data convergence protocol; and when the second core network is an evolved packet core EPC, the second packet data convergence protocol is an E-UTRA packet data convergence protocol.

It should be understood that the network device 900 completely corresponds to the network device in the method 300, the method 400, the method 500, the method 600, the method 700, the method 700A, and the method 700B, and may perform operations of the network device in the method 300, the method 400, the method 500, the method 600, the method 700, the method 700A, and the method 700B.

Figure 13:
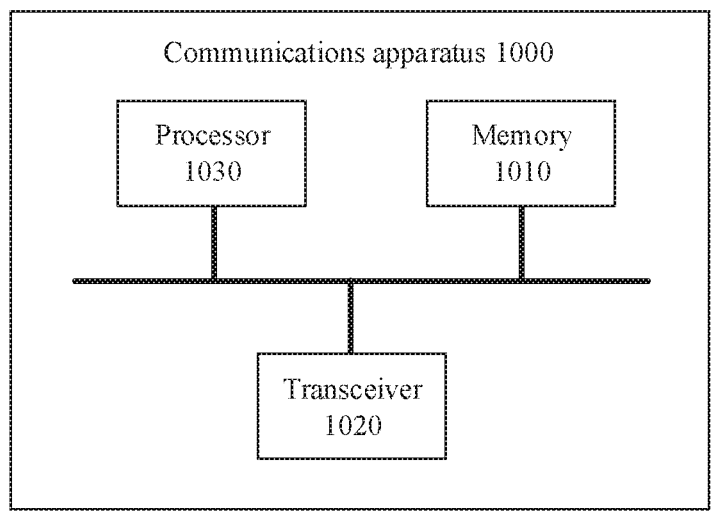
FIG. 13 is a schematic block diagram of a communications apparatus according to this application.

FIG. 13 is a schematic block diagram of a communications apparatus 1000 according to this application. The communications apparatus 1000 includes:

a memory 1010, configured to store a program, where the program includes code;

a transceiver 1020, configured to communicate with another device; and a processor 1030, configured to execute the program code in the memory 1010.

Optionally, when the code is executed, the processor 1030 may implement operations in the method 300, the method 400, the method 500, the method 600, the method 700, the method 700A, and the method 700B. For brevity, details are not described herein again. In this case, the communications apparatus 1000 may be a terminal device or a network device. The transceiver 1020 is configured to perform specific signal sending and receiving when driven by the processor 1030.

This application provides a chip system, including at least one processor, where the at least one processor is configured to execute a stored instruction, so that a terminal device can implement operations in the method 300 to the method 700B.

This application provides a chip system, including at least one processor, where the at least one processor is configured to execute a stored instruction, so that a network device can implement operations in the method 300 to the method 700B.

This application provides a computer program product. The computer program product includes an instruction, and when the instruction is executed, a terminal device is enabled to implement operations in the method 300 to the method 700B.

This application provides a computer program product. The computer program product includes an instruction, and when the instruction is executed, a network device is enabled to implement operations in the method 300 to the method 700B.

This application provides a computer storage medium. The computer storage medium stores a program instruction, and when the instruction is executed, a terminal device is enabled to implement operations in the method 300 to the method 700B.

This application provides a computer storage medium. The computer storage medium stores a program instruction, and when the instruction is executed, a network device is enabled to implement operations in the method 300 to the method 700B.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network access method, comprising:
   sending, by a terminal device, a first message to a network device, wherein the first message comprises first indication information, wherein the first indication information indicates a type of a core network to be accessed by the terminal device, wherein the type of the core network is a core network of a first system or a core network of a second system, and wherein the first system is a next generation of the second system;
   receiving, by the terminal device, a security mode command message from the network device; and
   using, by the terminal device, a packet data convergence protocol (PDCP) for the security mode command message, wherein a version of the PDCP corresponds to the type of the core network, wherein:
      when the first indication information indicates that the type of the core network to be accessed by the terminal device is the core network of the first system, using the PDCP for the security mode command message comprises:
         using, by the terminal device, a PDCP of the first system for the security mode command message,
      wherein the security mode command message comprises first security configuration information, and the first security configuration information comprises an algorithm defined in the second system for activating air interface security.

2. The method according to claim 1, wherein the first indication information indicates that the type of the core network to be accessed by the terminal device is the core network of the first system, and wherein the method further comprises:
   configuring, by the terminal device, a first signaling radio bearer based on a preset default configuration of the PDCP of the first system after sending the first message to the network device; and
   wherein the receiving, by the terminal device, a security mode command message from the network device comprises:
      receiving, by the terminal device, the security mode command message that is from the network device and that is transmitted via the first signaling radio bearer.

3. The method according to claim 1, wherein the first system is a 5th generation (5G) system, the second system is a 4th generation (4G) system, the first security configuration information comprises an algorithm defined in the 4G system for activating air interface security.

4. The method according to claim 3, wherein the first message is a radio resource control (RRC) connection setup request message.

5. The method according to claim 1, wherein
   after receiving the security mode command message from the network device, the method further comprises:
   deriving, by the terminal device, a key according to a security mechanism of the first system.

6. The method according to claim 1, wherein the core network of the first system is a next generation core network (5GC), and wherein the PDCP of the first system is a new radio (NR) packet data convergence protocol.

7. A communication apparatus used for a terminal device, comprising:
   a memory storing program instructions; and
   at least one processor coupled to the memory, wherein the program instructions, when executed by the at least one processor, cause the apparatus to perform operations comprising:
      sending a first message to a network device, wherein the first message comprises first indication information, wherein the first indication information indicates a type of a core network to be accessed by the terminal device, wherein the type of the core network is a core network of a first system or a core network of a second system, and wherein the first system is a next generation of the second system;
      receiving a security mode command message from the network device; and
      when the first indication information indicates that the type of the core network to be accessed by the terminal device is the core network of the first system, using a PDCP of the first system for the security mode command message,
      wherein the security mode command message comprises first security configuration information, and the first security configuration information comprises an algorithm defined in the second system for activating air interface security.

8. The communication apparatus according to claim 7, wherein the first indication information indicates that the type of the core network to be accessed by the terminal device is the core network of the first system, and wherein the operations further comprise:
   processing a first signaling radio bearer based on a preset default configuration of the PDCP of the first system after the first message is sent to the network device; and
   receiving the security mode command message that is from the network device and that is transmitted via the first signaling radio bearer.

9. The communication apparatus according to claim 7, wherein the first system is a 5th generation (5G) system, the second system is a 4th generation (4G) system, the first security configuration information comprises an algorithm defined in the 4G system for activating air interface security.

10. The communication apparatus according to claim 9, wherein the first message is a radio resource control (RRC) connection setup request message.

11. The communication apparatus according to claim 7, wherein
   after receiving the security mode command message from the network device, the operations further comprise:
   deriving a key according to a security mechanism of the first system.

12. The communication apparatus according to claim 7, wherein:
   when the core network of the first system is a next generation core network (5GC), the PDCP of the first system is a new radio (NR) packet data convergence protocol.

13. A communication apparatus used for a network device, comprising:
   a memory storing program instructions; and
   at least one processor coupled to the memory, wherein the program instructions, when executed by the at least one processor, cause the apparatus to perform operations comprising:

receiving a first message from a terminal device, wherein the first message comprises first indication information, wherein the first indication information indicates a type of a core network to be accessed by the terminal device, wherein the type of the core network is a core network of a first system or a core network of a second system, and wherein the first system is a next generation of the second system;

sending, to the terminal device, a security mode command message; and when the first indication information indicates that the type of the core network to be accessed by the terminal device is the core network of the first system, using a PDCP of the first system for the security mode command message, wherein the security mode command message comprises first security configuration information, and the first security configuration information comprises an algorithm defined in the second system for activating air interface security.

14. The communication apparatus according to claim 13, wherein the first system is a 5th generation (5G) system, the second system is a 4th generation (4G) system, and wherein the first security configuration information comprises an algorithm defined in the 4G system for activating air interface security.

15. The communication apparatus according to claim 14, wherein the first message is a radio resource control (RRC) connection setup request message.

16. The communication apparatus according to claim 14, wherein the security mode command message is used to derive a key according to a security mechanism of the 5G system.

17. The communication apparatus according to claim 13, wherein:

when the core network of the first system is a next generation core network (5GC), the PDCP of the first system is a new radio (NR) packet data convergence protocol.

* * * * *